(12) United States Patent
Yamaguchi et al.

(10) Patent No.: US 11,777,315 B2
(45) Date of Patent: Oct. 3, 2023

(54) POWER CONVERSION DEVICE SUPPRESSING PHASE JUMP

(71) Applicant: Kawasaki Jukogyo Kabushiki Kaisha, Kobe (JP)

(72) Inventors: Naoki Yamaguchi, Akashi (JP); Yusuke Umezu, Kakogawa (JP); Soichiro Bando, Kobe (JP); Kazushige Sugimoto, Amagasaki (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 231 days.

(21) Appl. No.: 17/356,547

(22) Filed: Jun. 24, 2021

(65) Prior Publication Data

US 2021/0320498 A1  Oct. 14, 2021

Related U.S. Application Data

(63) Continuation of application No. PCT/JP2019/050280, filed on Dec. 23, 2019.

(30) Foreign Application Priority Data

Dec. 27, 2018  (JP) ................................ 2018-245120

(51) Int. Cl.
*H02J 3/32* (2006.01)
*H02J 3/16* (2006.01)
(Continued)

(52) U.S. Cl.
CPC ................... *H02J 3/32* (2013.01); *H02J 3/16* (2013.01); *H02M 7/003* (2013.01); *H02M 7/797* (2013.01); *H02J 2310/42* (2020.01)

(58) Field of Classification Search
CPC ............ H02J 3/32; H02J 3/16; H02J 2310/42; H02M 7/797; H02M 7/003
See application file for complete search history.

(56) References Cited

U.S. PATENT DOCUMENTS 9,927,825 B2 * 3/2018 Takaguchi ................ H02J 3/32
2011/0098866 A1 * 4/2011 Muneshima .............. H02J 3/48
700/293
(Continued)

FOREIGN PATENT DOCUMENTS

JP 2012-143018 A 7/2012
JP 5631712 B2 11/2014
(Continued)

*Primary Examiner* — Harry R Behm
(74) *Attorney, Agent, or Firm* — XSENSUS LLP

(57) ABSTRACT

A power converter, a voltage detector that detects a system voltage at an AC wiring side of the power converter; and a controller that performs power conversion control between AC wiring and DC wiring by transmitting a drive signal to the power converter. The controller includes: a phase calculator that calculates a current phase from the system voltage detected by the voltage detector; a phase jump angle calculator that calculates a virtual phase that follows temporal changes in the current phase in a lagging manner, and calculates a phase difference between the current phase and the virtual phase as a phase jump angle; and a drive signal generator that generates the drive signal to the power converter, which is a signal for adjusting active power that is inputted to/outputted from the power converter so as to suppress the phase jump angle.

14 Claims, 15 Drawing Sheets

(51) Int. Cl.
    *H02M 7/00*         (2006.01)
    *H02M 7/797*       (2006.01)

(56) References Cited

U.S. PATENT DOCUMENTS

| | | | | |
|---|---|---|---|---|
| 2011/0184571 A1* | 7/2011 | Oi | ............................ | G05B 5/01 |
| | | | | 700/287 |
| 2014/0152110 A1 | 6/2014 | Sugimoto et al. | | |
| 2015/0001939 A1* | 1/2015 | Kojima | .................... | H02J 3/32 |
| | | | | 307/52 |

FOREIGN PATENT DOCUMENTS

| | | | |
|---|---|---|---|
| JP | 5956991 B2 | | 7/2016 |
| JP | 7023430 B1 | * | 2/2022 |

* cited by examiner

POWER CONVERSION DEVICE SUPPRESSING PHASE JUMP

CROSS-REFERENCE TO RELATED APPLICATIONS

The present application is a bypass continuation of PCT Application No. PCT/JP2019/050280, filed Dec. 23, 2019, which claims priority to JP 2018-245120, filed on Dec. 27, 2018, the entire contents of each are incorporated herein by its reference.

TECHNICAL FIELD

The present disclosure relates to power conversion devices.

BACKGROUND ART

There have been known variable-frequency (VF) generator power supply systems that are used in, for example, mobile vehicles such as ships and aircrafts. In such a generator power supply system, there are cases where a load variation (a variation in load power) that is relatively great for the power generator capacity occurs within a short period of time. For example, in some cases, the range of such a load variation reaches approximately half of the power generator capacity.

In order to suppress such a load variation, it is conceivable to connect a power conversion device to AC wiring to which the power generator and the load are connected, and perform load power compensation. Conventionally, for performing load power compensation with use of a power conversion device, there are known methods that utilize a frequency variation caused by a load variation (see Patent Literatures 1 to 3 listed below).

CITATION LIST

Patent Literature

PTL 1: Japanese Laid-Open Patent Application Publication No. 2012-143018
PTL 2: Japanese Patent No. 5956991
PTL 3: Japanese Patent No. 5631712

SUMMARY

A power conversion device according to one aspect of the present disclosure includes: a power converter disposed between AC wiring, to which a power generator and an electrical load are connected, and DC wiring, to which an energy storage is connected, the power converter being configured to convert AC power inputted to the power converter through the AC wiring into DC power and charge the energy storage with the DC power, and to convert DC power inputted to the power converter through the DC wiring, the DC power being discharged from the energy storage, into AC power and output the AC power to the AC wiring; a voltage detector that detects a system voltage at the AC wiring side of the power converter; and a controller that performs power conversion control between the AC wiring and the DC wiring by transmitting a drive signal to the power converter. The controller includes: a phase calculator that calculates a current phase from the system voltage detected by the voltage detector; a phase jump angle calculator that calculates a virtual phase that follows temporal changes in the current phase in a lagging manner, and calculates a phase difference between the current phase and the virtual phase as a phase jump angle; and a drive signal generator that generates the drive signal to the power converter, which is a signal for adjusting active power that is inputted to/outputted from the power converter so as to suppress the phase jump angle.

According to the above configuration, a load variation is detected depending on the phase jump angle, which is calculated based on temporal changes in the phase of the AC wiring. The phase jump angle indicates a change in an internal phase difference angle of the power generator, and is a value dependent on an active power load of the power generator. Therefore, by adjusting the active power that is inputted to/outputted from the power converter based on the phase jump angle, electric power compensation for the load variation can be performed without depending on a frequency variation.

DESCRIPTION OF EMBODIMENTS

Figure 1:
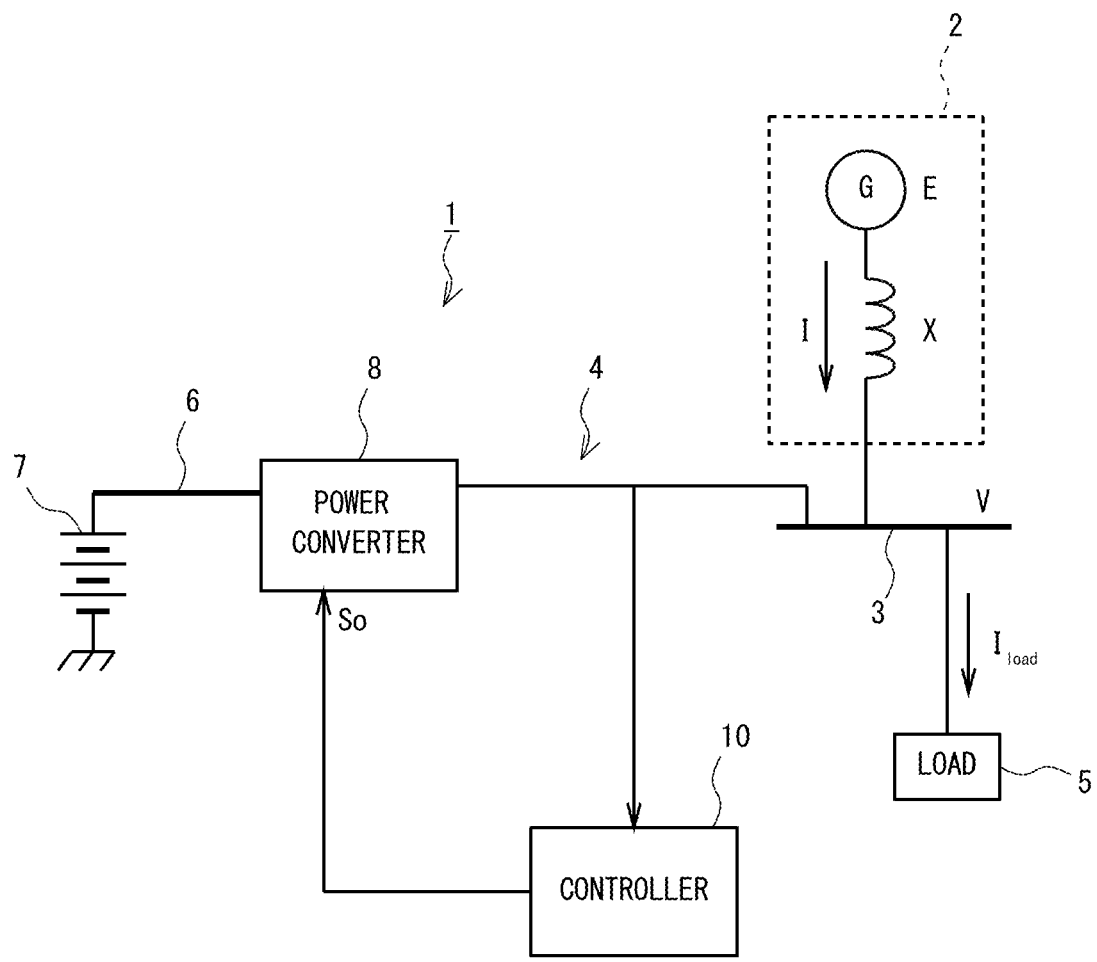
FIG. 1 is a block diagram showing a schematic configuration of a generator power supply system to which a power conversion device according to an exemplary embodiment of the present disclosure is applied.

Hereinafter, embodiments of the present disclosure are described with reference to the drawings. In the drawings, the same elements or elements having the same functions are denoted by the same reference signs, and repeating the same descriptions is avoided below.

[System Configuration]

Hereinafter, an exemplary embodiment of the present disclosure is described. FIG. 1 is a block diagram showing a schematic configuration of a generator power supply system to which a power conversion device according to an exemplary embodiment of the present disclosure is applied. A generator power supply system 1 (in the description below, simply referred to as "the power supply system 1") of the present embodiment includes a variable-frequency power generator 2 and AC wiring 3. The power generator 2 is connected to the AC wiring 3. A breaker (GCB: Generator Circuit Breaker) is provided between the power generator 2 and the AC wiring 3. The power generator 2 supplies AC power to an electrical load 5 (in the description below, simply referred to as "the load 5") connected to the AC wiring 3.

The power supply system 1 further includes DC wiring 6 and an energy storage 7. The energy storage 7 is connected to the DC wiring 6. A power conversion device 4 includes a power converter 8 and a controller 10. The power converter 8 is disposed between the AC wiring 3 and the DC wiring 6. The controller 10 controls the power converter 8.

The power converter 8 is configured to convert AC power inputted to the power converter 8 through the AC wiring 3 into DC power and charge the energy storage 7 with the DC power, and to convert DC power inputted to the power converter 8 through the DC wiring 6, the DC power being discharged from the energy storage 7, into AC power and output the AC power to the AC wiring 3. The power converter 8 is constituted by a power conversion circuit that includes a switching element such as an IGBT. The controller 10 is constituted by, for example, a computer such as a microcontroller, a memory, and/or an electronic circuit. The controller 10 performs power conversion control between the AC wiring 3 and the DC wiring 6 by transmitting, to the power converter 8, a drive signal So for turning ON/OFF the switching element of the power converter 8. The functionality of the elements disclosed herein including but not limited to the controller 10 may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

[Phase Jump Angle]

Figure 2:
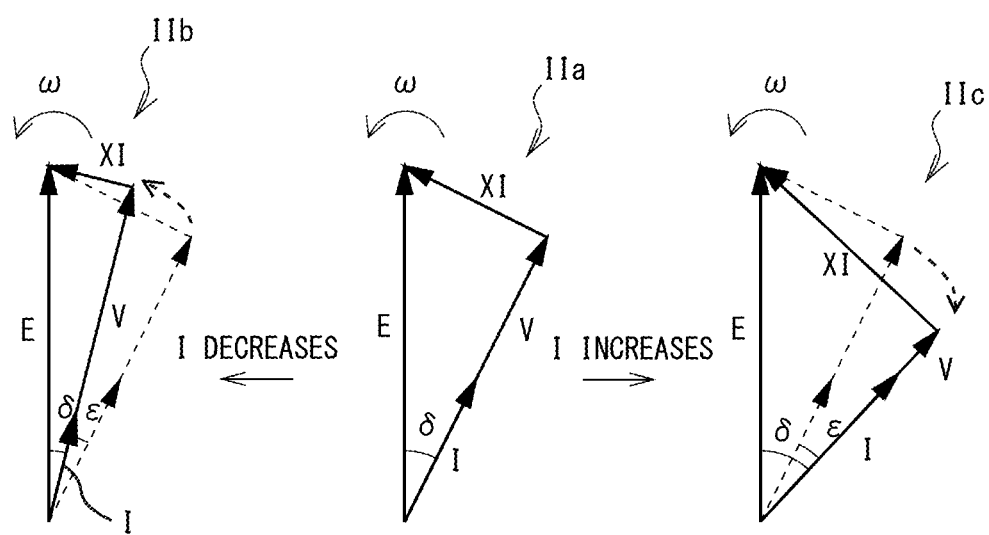
FIG. 2 shows an example in which a vector diagram of a synchronous generator changes due to changes in electric current.

Hereinafter, a phase jump angle used in the present embodiment is described. FIG. 2 shows an example in which a vector diagram of a synchronous generator changes due to changes in electric current. In FIG. 2, IIa is a reference vector diagram; IIb is a vector diagram in a case where an electric current I flowing through the power generator 2 decreases; and IIc is a vector diagram in a case where the electric current I flowing through the power generator 2 increases.

As shown in FIG. 1 and FIG. 2, the internal induced voltage of the power generator 2 is E; the generator reactance of the power generator 2 is X; the electric current flowing through the power generator 2 is I; the voltage of the AC wiring 3 (the system voltage) is V; and the angular velocity of the power generator 2 is ω. An internal phase difference angle δ represents the phase difference between the internal induced voltage E of the power generator 2 and the system voltage V, which is the terminal voltage of the power generator 2. The description below takes only active power components into account. The description below is given assuming that instantaneous load variations occur. Accordingly, the internal induced voltage E of the power generator 2 is assumed to be constant.

In the reference vector diagram IIa, when a load current $I_{load}$ flowing to the load 5 decreases due to a decrease in the load power, the electric current I flowing through the power generator 2 also decreases. As a result, as shown in the vector diagram IIb, the product XI of the generator reactance X and the electric current I also decreases. That is, the length of the vector XI decreases. The system voltage V is a value that is determined as a result of the electric current I flowing through the generator reactance X. Therefore, the system voltage V increases due to the decrease in the electric current I. Consequently, the internal phase difference angle δ of the vector diagram IIb decreases from that of the reference vector diagram IIa.

On the other hand, in the reference vector diagram IIa, when the load current $I_{load}$ flowing to the load 5 increases due to an increase in the load power, the electric current I flowing through the power generator 2 also increases. As a result, as shown in the vector diagram IIc, the product XI of the generator reactance X and the electric current I also increases. That is, the length of the vector XI increases. The system voltage V decreases due to the increase in the electric current I. Consequently, the internal phase difference angle δ of the vector diagram IIe increases from that of the reference vector diagram IIa.

As described above, the internal phase difference angle δ increases in accordance with an increase in the load power, and decreases in accordance with a decrease in the load power. However, the internal phase difference angle δ cannot be directly detected, because, for example, the rotation angle of the power generator 2 cannot be directly detected. In light of this, the present disclosure is characterized by calculating the amount of variation in the internal phase difference angle δ from the system voltage V through arithmetic operation. When the load power instantaneously increases or decreases, the internal phase difference angle δ varies in a stepwise manner. The amount of such an instantaneous variation in the internal phase difference angle δ is a phase jump angle ε.

Figure 3:
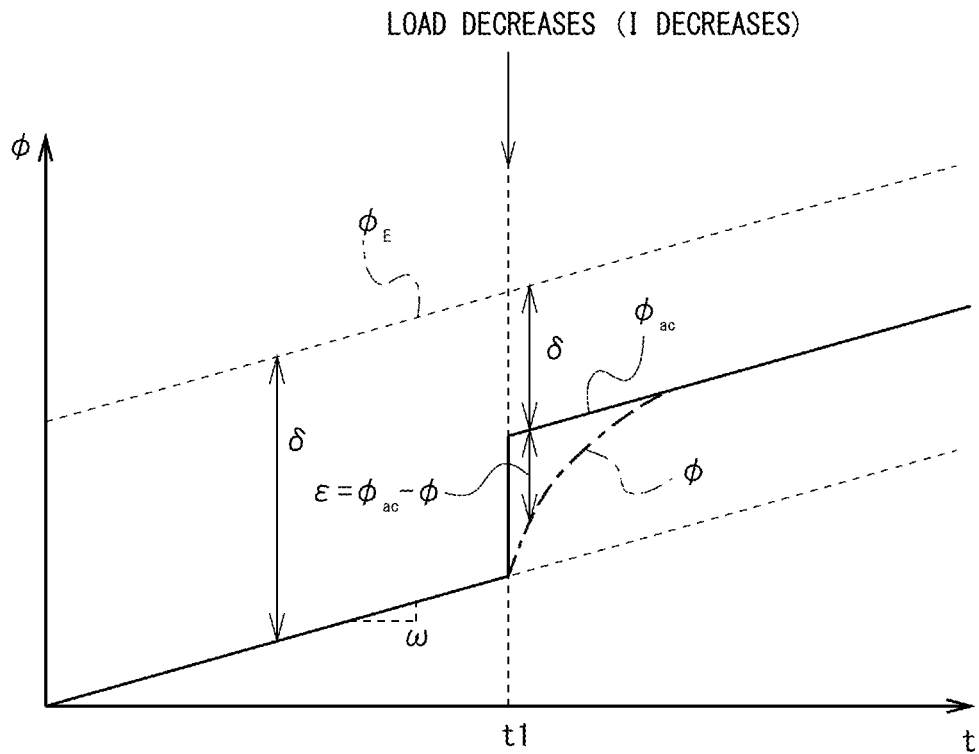
FIG. 3 is a graph showing temporal changes in the phase (current phase) of AC wiring when the load decreases.

FIG. 3 to FIG. 6 are conceptual diagrams for describing a method of calculating the phase jump angle. FIG. 3 is a graph showing temporal changes in the phase (current phase) $\varphi_{ac}$ of the AC wiring 3 when the load decreases. FIG. 3 shows an example case where the rotation speed of the power generator 2 is constant. At the time, the rotation angle (rotor angle) $\varphi_E$ of the power generator 2 increases linearly with a slope of the angular velocity ω as time elapses. While there is no load variation, the phase $\varphi_{ac}$ of the AC wiring 3 increases linearly in accordance with an increase in the rotor angle $\varphi_E$. The internal phase difference angle δ is the difference between the rotor angle $\varphi_E$ and the phase $\varphi_{ac}$ of the AC wiring 3, and the internal phase difference angle δ is constant during a period of no load variation from a time t=0 to a time t1.

If the load power decreases at the time t1, the internal phase difference angle δ decreases as mentioned above. Specifically, at the time t1, the phase $\varphi_{ac}$ of the AC wiring 3 increases in a stepwise manner. The amount of the increase in the phase $\varphi_{ac}$ of the AC wiring 3 is the phase jump angle ε.

In order to determine the amount of the increase in the phase $\varphi_{ac}$ of the AC wiring 3, the present embodiment adopts the concept of a "virtual phase φ", which follows temporal changes in the phase $\varphi_{ac}$ in a lagging manner. The virtual phase φ has a value that is slightly lagged from the current phase $\varphi_{ac}$. The virtual phase φ follows the current phase $\varphi_{ac}$ with a time lag so as to eliminate the difference between the current phase $\varphi_{ac}$ and the virtual phase φ.

Accordingly, when the load power decreases, the virtual phase φ increases non-linearly from the time t1, at which a load variation occurs. The virtual phase φ gradually becomes closer to the current phase $\varphi_{ac}$, and the difference between the virtual phase φ and the current phase $\varphi_{ac}$ becomes 0 again. By adopting such a concept of "virtual phase φ", the phase jump angle ε can be determined as the difference between the current phase $\varphi_{ac}$ and the virtual phase φ (ε=$\varphi_{ac}$−φ).

Figure 4:
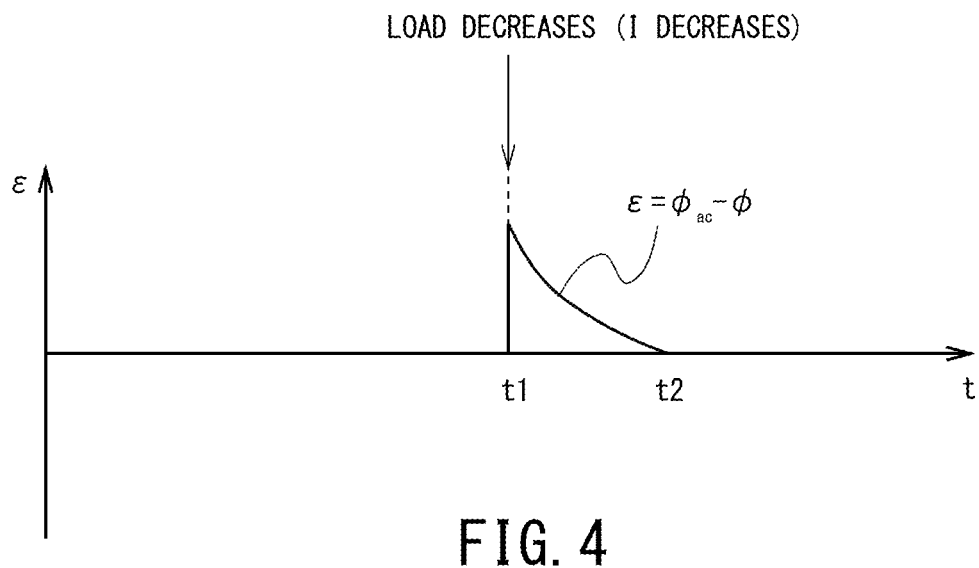
FIG. 4 is a graph showing temporal changes in a phase jump angle of FIG. 3.

FIG. 4 is a graph showing temporal changes in the phase jump angle ε of FIG. 3. As shown in FIG. 4, while there is no load variation, the phase jump angle ε is 0. At the time t1, at which the decrease in the load power occurs, the phase jump angle ε takes a predetermined positive value (i.e., the phase jump angle ε occurs in the leading direction). Thereafter, the phase jump angle ε decreases logarithmic-functionally, and returns to 0.

Figure 5:
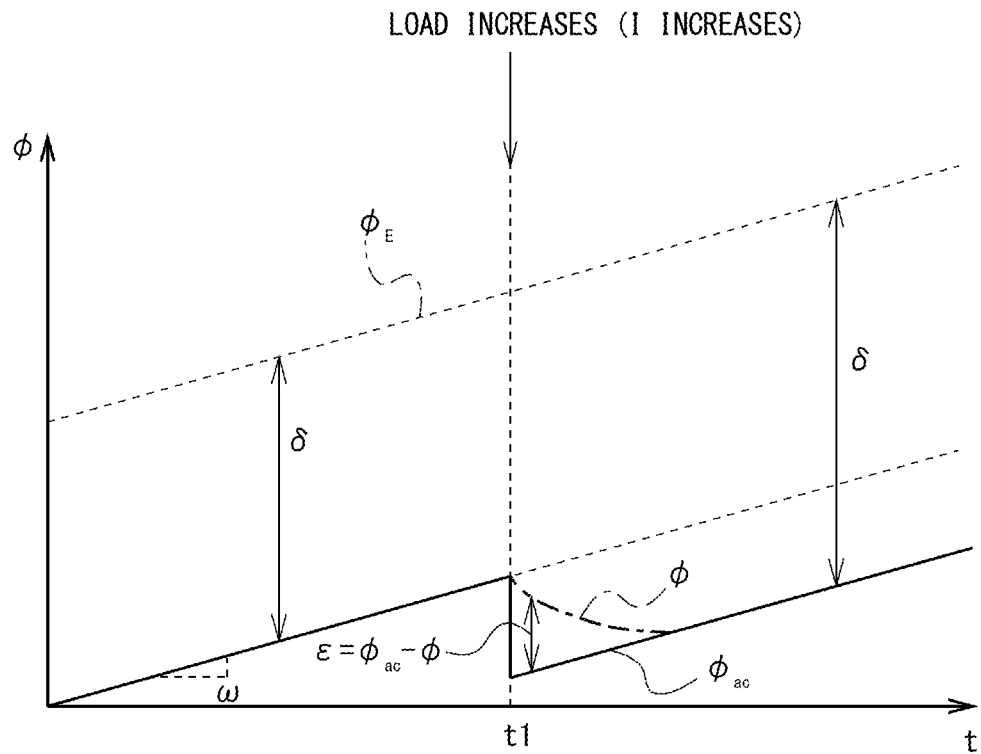
FIG. 5 is a graph showing temporal changes in the phase (current phase) of the AC wiring when the load increases.

FIG. 5 is a graph showing temporal changes in the phase (current phase) $\varphi_{ac}$ of the AC wiring 3 when the load increases. Also in FIG. 5, the rotor angle $\varphi_E$, and the phase $\varphi_{ac}$ of the AC wiring 3 during a period of no load variation, increase linearly as time elapses.

If the load power increases at the time t1, the internal phase difference angle δ increases as mentioned above. Specifically, at the time t1, the phase $\varphi_{ac}$ of the AC wiring 3 decreases in a stepwise manner. The amount of the decrease in the phase $\varphi_{ac}$ of the AC wiring 3 is the phase jump angle ε.

Similar to FIG. 3, in the case of adopting the virtual phase φ, when the load power increases, the virtual phase φ decreases non-linearly from the time t1, at which a load variation occurs. The virtual phase φ gradually becomes closer to the current phase $\varphi_{ac}$, and the difference between the virtual phase φ and the current phase $\varphi_{ac}$ becomes 0 again.

Figure 6:
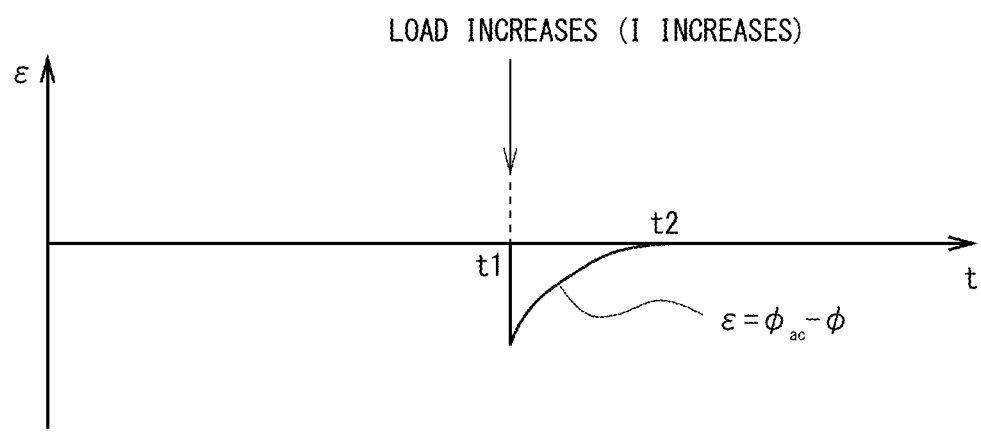
FIG. 6 is a graph showing temporal changes in a phase jump angle of FIG. 5.

FIG. 6 is a graph showing temporal changes in the phase jump angle ε of FIG. 5. As shown in FIG. 6, while there is no load variation, the phase jump angle ε is 0. At the time t1, at which the increase in the load power occurs, the phase jump angle ε takes a predetermined negative value (i.e., the phase jump angle ε occurs in the lagging direction). Thereafter, the phase jump angle ε increases logarithmic-functionally, and returns to 0.

When the phase jump angle ε as described above takes a negative value, the controller 10 of the present embodiment supplies active power to the AC wiring 3 (i.e., discharges the energy storage 7), whereas when the phase jump angle ε takes a positive value, the controller 10 controls the power converter 8 to absorb the active power of the AC wiring 3 (i.e., charges the energy storage 7).

[Specific Example of Controller]

Figure 7:
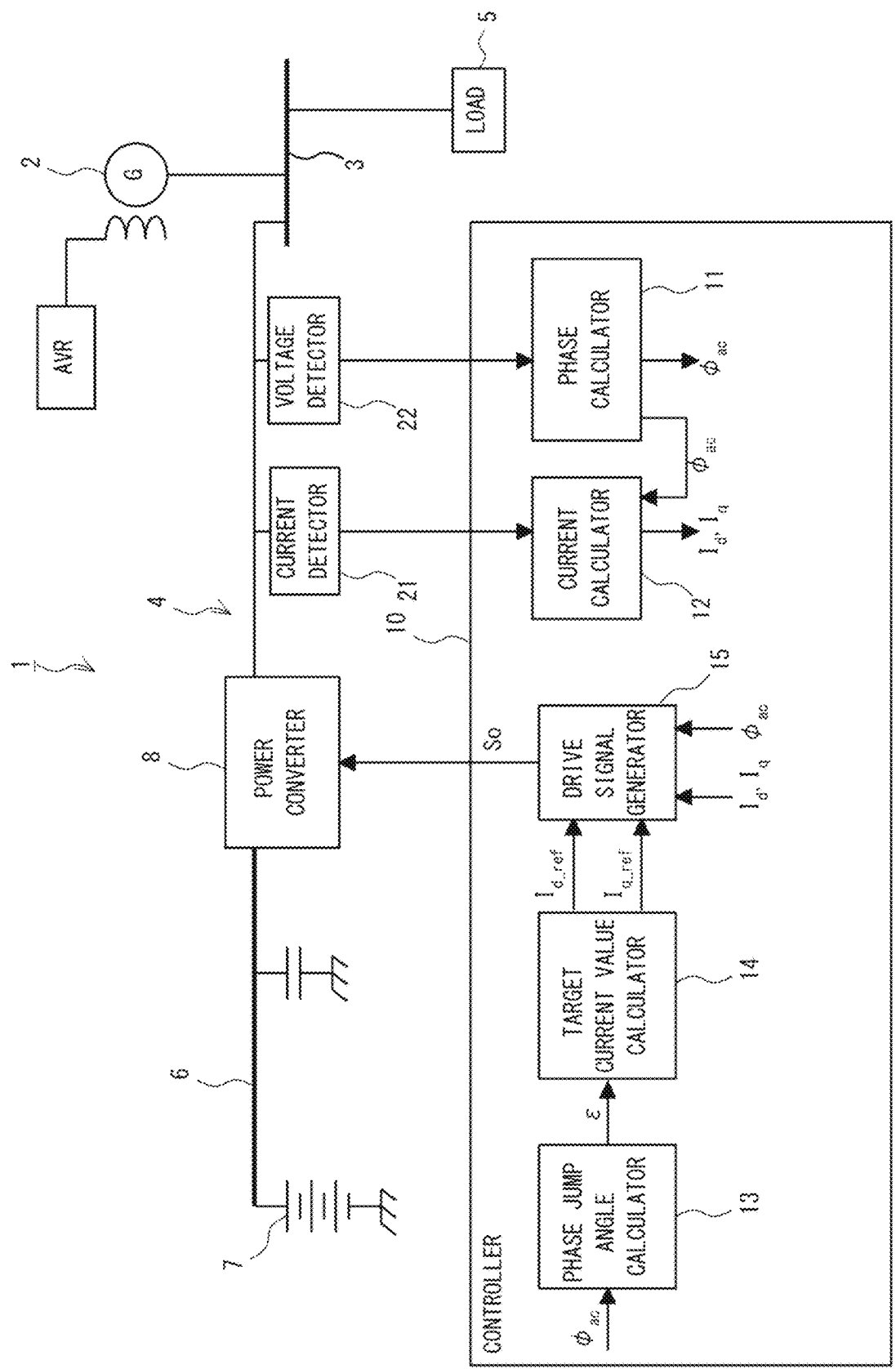
FIG. 7 is a block diagram showing a schematic configuration of a control system of the power conversion device of an exemplary embodiment.

Hereinafter, more specific control modes are described. FIG. 7 is a block diagram showing a schematic configuration of a control system of the power conversion device of an exemplary embodiment. The controller 10 shown in FIG. 7 is configured as a controller of a current-control type. The controller 10 of a current-control type controls the power converter 8 by using alternating currents $I_d$ and $I_q$ of the AC wiring as control elements. Therefore, the power conversion device 4 includes a current detector 21, which detects an output current outputted from the power converter 8 to the AC wiring 3. The current detector 21 detects instantaneous current values $i_a$, $i_b$, and $i_c$ of the respective phases of a three-phase alternating current. For example, a CT (Current Transformer) is used as the current detector 21.

In the present embodiment, as described below, the controller 10 calculates the current phase $\varphi_{ac}$ from the system voltage at the AC wiring 3 side of the power converter 8. Therefore, the power conversion device 4 includes a voltage detector 22, which detects the system voltage at the AC wiring 3 side of the power converter 8. The voltage detector 22 detects instantaneous voltage values $v_a$, $v_b$, and $v_c$ of the respective phases of a three-phase alternating current. For example, a PT (Potential Transformer) is used as the voltage detector 22.

The values detected by the detectors 21 and 22 are inputted to the controller 10. The controller 10 includes the following control blocks: a phase calculator 11; a current calculator 12; a phase jump angle calculator 13; a target current value calculator 14; and a drive signal generator 15.

[Phase Calculator]

The phase calculator 11 calculates the current phase $\varphi_{ac}$ of the AC wiring 3 by known PLL (Phase Lock Loop) operation from the system voltage (the instantaneous voltage values $v_a$, $v_b$, and $v_c$ of the respective phases) detected by the voltage detector 22.

[Current Calculator]

The current calculator 12 calculates electric currents of the respective coordinate axes in an alternating-current rotating coordinate system (i.e., d-axis current $I_d$ and q-axis current $I_q$) from the instantaneous current values $i_a$, $i_b$, and $i_c$ of the respective phases, which are detected by the current detector 21, and the phase $\varphi_{ac}$ calculated by the phase calculator 11, by using an equation shown below.

[Math. 1]

$$\begin{bmatrix} I_d \\ I_q \end{bmatrix} = \sqrt{\frac{2}{3}} \begin{bmatrix} \cos\phi_{ac} & \cos\left(\phi_{ac} - \frac{2}{3}\pi\right) & \cos\left(\phi_{ac} - \frac{4}{3}\pi\right) \\ -\sin\phi_{ac} & -\sin\left(\phi_{ac} - \frac{2}{3}\pi\right) & -\sin\left(\phi_{ac} - \frac{4}{3}\pi\right) \end{bmatrix} \begin{bmatrix} i_a \\ i_b \\ i_c \end{bmatrix} \quad (1)$$

[Phase Jump Angle Calculator]

Figure 8:
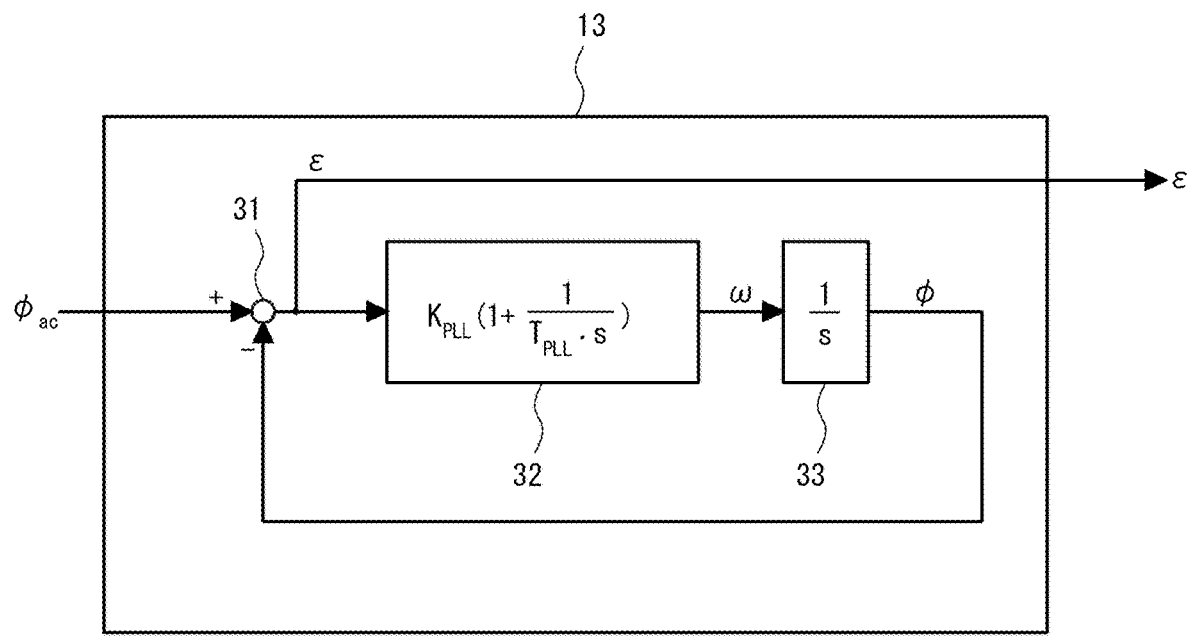
FIG. 8 shows one exemplary mode of calculation performed by a phase jump angle calculator of the present embodiment.

The phase jump angle calculator 13 calculates a phase difference $\varphi_{ac}-\varphi$ between the current phase $\varphi_{ac}$ and the virtual phase $\varphi$ as a phase jump angle ε. FIG. 8 shows one exemplary mode of calculation performed by the phase jump angle calculator of the present embodiment.

The phase jump angle calculator 13 calculates the virtual phase $\varphi$, which follows temporal changes in the current phase $\varphi_{ac}$ in a lagging manner, and calculates the phase difference $\varphi_{ac}-\varphi$ between the current phase $\varphi_{ac}$ and the virtual phase $\varphi$ as the phase jump angle ε. The phase jump angle calculator 13 calculates the virtual phase $\varphi$ by performing phase lock loop (PLL) operation on the current phase $\varphi_{ac}$.

More specifically, as shown in FIG. 8, the phase jump angle calculator 13 includes an estimator 32 and an integrator 33. The estimator 32 estimates a past system frequency ω of the AC wiring 3 from the phase jump angle ε in a past time. The integrator 33 calculates, as the virtual phase $\varphi$, a past phase by integrating the estimated past system frequency ω. The estimator 32 is configured as a PI controller. A transfer function $G_1$ (s) of the PI controller is represented by an equation shown below by using a gain $K_{PLL}$ and an integral time $T_{PLL}$.

[Math. 2]

$$G_l(s) = K_{PLL}\left(1 + \frac{1}{T_{PLL} \cdot s}\right) \quad (2)$$

The past system frequency ω estimated by the estimator 32 is integrated by the integrator 33, and thereby the virtual phase $\varphi$ is calculated. Consequently, the phase jump angle calculator 13 is configured to integrate the past phase jump angle ε twice by the estimator 32 and the integrator 33.

The current phase $\varphi_{ac}$ and the virtual phase $\varphi$ are inputted to a subtracter 31. The phase jump angle calculator 13 outputs a phase difference $\varphi_{ac}-\varphi$ that is obtained by subtraction by the subtracter 31 as a phase jump angle ε. The phase jump angle ε calculated by the subtracter 31 is inputted to the estimator 32 again as a past phase jump angle ε.

According to this configuration, by performing the calculation of estimating a past phase, the virtual phase $\varphi$, which follows temporal changes in the current phase $\varphi_{ac}$ in a lagging manner, can be calculated from the current phase $\varphi_{ac}$ by relatively easy calculation.

[Target Current Value Calculator]

Figure 9:
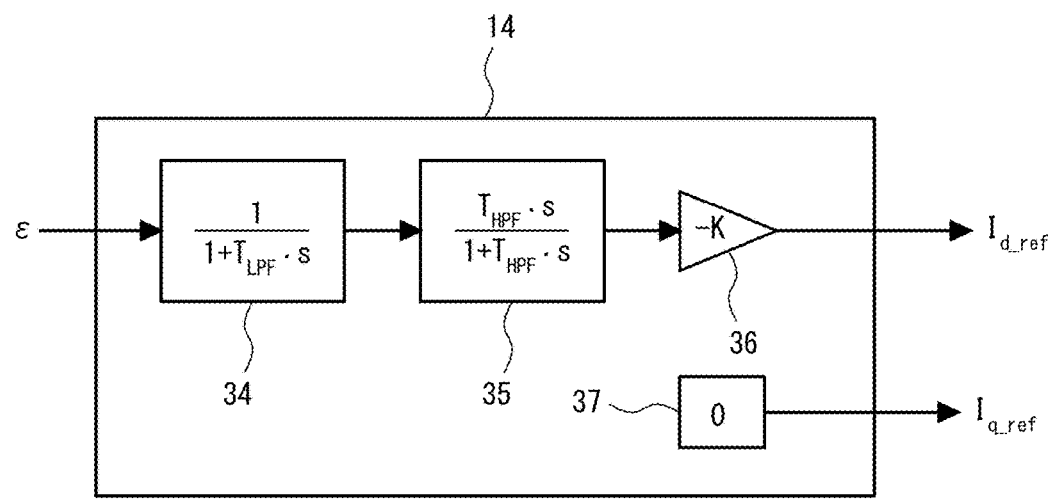
FIG. 9 shows one exemplary mode of calculation performed by a target current value calculator of the present embodiment.

FIG. 9 shows one exemplary mode of calculation performed by the target current value calculator of the present embodiment. The target current value calculator 14 calculates a target current value $I_{d\_ref}$ by applying predetermined filters to the phase jump angle ε calculated by the phase jump angle calculator 13 and multiplying an output from the filters by a predetermined proportional gain (−K).

As shown in FIG. 9, the target current value calculator 14 of the present embodiment includes a first filter 34, a second filter 35, and a gain multiplier 36. The first filter 34 is constituted by a low-pass filter. For example, the transfer function of the first filter 34 is expressed as $1/(1+T_{LPF} \cdot s)$ by using a time constant $T_{LPF}$. The second filter 35 is constituted by a high-pass filter. For example, the transfer function of the second filter 35 is expressed as $T_{HPF} \cdot s/(1+T_{HPF} \cdot s)$ by using a time constant $T_{HPF}$.

The controller 10 applies the first filter 34 and the second filter 35 to the phase jump angle ε, and multiplies an output from the first filter 34 and the second filter 35 by a proportional gain (−K) to calculate a target value $I_{d\_ref}$ of the d-axis current outputted from the power converter 8 to the AC wiring 3. Further, the controller 10 outputs a predetermined fixed value (in the example of FIG. 9, outputs 0) from a fixed value outputter 37 as a target value $I_{q\_ref}$ of the q-axis current.

By applying the filters to the phase jump angle ε, response characteristics to the phase jump angle ε can be adjusted, which makes it possible to generate a more optimized drive signal So. For example, in a case where a load variation occurs periodically, suppressing effects in response to the load variation can be increased by setting the time constants $T_{LPF}$ and $T_{HPF}$ of the filters such that the filters have high sensitivity in the load-varying regions.

It should be noted that the target current value calculator 14 may include either one of the first filter 34 or the second filter 35. The target current value calculator 14 may further include a different filter other than the first filter 34 and the second filter 35 (e.g., a band-pass filter). Further, in a case where the filtering process is unnecessary, direct conversion into the target current value $I_{d\_ref}$ may be performed without the filtering process.

As shown in FIG. 4 and FIG. 6, if the load decreases, the phase jump angle ε becomes a positive value (the phase jump angle ε occurs in the leading direction), whereas if the load increases, the phase jump angle ε becomes a negative value (the phase jump angle ε occurs in the lagging direction). In a case where the electric current outputted from the power converter 8 to the AC wiring 3 is a positive value, if the load decreases, the controller 10 outputs a negative value as the target value $I_{d\_ref}$ of the d-axis current, whereas if the load increases, the controller 10 outputs a positive value as the target value $I_{d\_ref}$ of the d-axis current.

[Drive Signal Generator]

The drive signal generator 15 generates the drive signal So to the power converter 8, which is a signal for adjusting active power that is inputted to/outputted from the power converter 8 so as to suppress the phase jump angle ε. To be more specific, the controller 10 generates the drive signal So for performing feedback control such that the alternating currents $I_d$ and $I_q$ outputted from the power converter 8 to the AC wiring 3 are adjusted to the target current values $I_{d\_ref}$ and $T_{q\_ref}$ calculated by the target current value calculator 14. Therefore, the alternating currents $I_d$ and $I_q$ outputted to the AC wiring 3, the current phase $\varphi_{ac}$, and the target current values $I_{d\_ref}$ and $I_{u\_ref}$ are inputted to the drive signal generator 15. The drive signal generator 15 calculates target voltage values $V_{d\_ref}$ and $V_{q\_ref}$ from the target current values $I_{d\_ref}$ and $I_{q\_ref}$, respectively, by using equations shown below. In these equations, each of $K_d$ and $K_q$ is a predetermined gain, and each of $T_{id}$ and $T_{iq}$ is a predetermined time constant.

[Math. 3]

$$V_{d\_ref} = K_d\left(1 + \frac{1}{T_{id} \cdot s}\right)(I_{d\_ref} - I_d) \quad (3)$$

$$V_{q\_ref} = K_q\left(1 + \frac{1}{T_{iq} \cdot s}\right)(I_{q\_ref} - I_q)$$

The drive signal generator 15 calculates target values $V_{a\_ref}$, $V_{b\_ref}$, and $V_{c\_ref}$ of respective instantaneous voltages $V_a$, $V_b$, and $V_c$ of the three-phase AC wiring 3 from the target voltage values $V_{d\_ref}$ and $V_{q\_ref}$ by using an equation shown below.

[Math. 4]

$$\begin{bmatrix} V_{a\_ref} \\ V_{b\_ref} \\ V_{c\_ref} \end{bmatrix} = \sqrt{\frac{2}{3}} \begin{bmatrix} \cos\phi_{ac} & -\sin\phi_{ac} \\ \cos\left(\phi_{ac} - \frac{2}{3}\pi\right) & -\sin\left(\phi_{ac} - \frac{2}{3}\pi\right) \\ \cos\left(\phi_{ac} - \frac{4}{3}\pi\right) & -\sin\left(\phi_{ac} - \frac{4}{3}\pi\right) \end{bmatrix} \begin{bmatrix} V_{d\_ref} \\ V_{q\_ref} \end{bmatrix} \quad (4)$$

According to the above configuration, a load variation is detected depending on the phase jump angle ε, which is calculated based on temporal changes in the phase $\phi_{ac}$ of the AC wiring 3. The phase jump angle ε indicates a change in the internal phase difference angle δ of the power generator 2, and is a value dependent on an active power load of the power generator 2. Accordingly, the controller 10 controls the power converter 8 such that in a case where the phase jump angle ε occurs in the leading direction, the power converter 8 absorbs the active power of the AC wiring 3, whereas in a case where the phase jump angle ε occurs in the lagging direction, the power converter 8 supplies active power to the AC wiring 3. In this manner, a power variation, a voltage variation, and a phase jump of the AC wiring 3 due to a load variation are suppressed.

As described above, by adjusting the active power that is inputted to/outputted from the power converter 8 based on the phase jump angle ε, electric power compensation for a load variation can be performed without depending on a frequency variation. Therefore, electric power compensation for a load variation can be realized also in the power supply system 1 including the variable-frequency power generator 2.

In particular, the impedance and excitation circuit responsiveness of the variable-frequency power generator 2 vary greatly depending on the frequency. For this reason, in some control modes for stabilization, it is possible that the stability cannot be entirely maintained in all the regions. In this respect, according to the power conversion device 4 of the present embodiment, active control of, for example, a governor (speed governor) and an AVR (automatic voltage regulator) of the power generator 2 need not be performed, but passive control is performed so as to suppress a transient variation occurring in the AC wiring 3. For this reason, the control by the power conversion device 4 does not interfere with the control of, for example, the governor and the AVR of the power generator 2. Therefore, the control and adjustments by the power conversion device 4 can be readily performed.

A period in which electric power is supplied from the power converter 8 to the AC wiring 3, and a period in which the electric power of the AC wiring 3 is absorbed by the power converter 8, are each a short period of time in which a phase jump occurs due to a load variation (the phase jump angle ε is not 0), i.e., a period from the time t1 to the time t2 shown in FIG. 4 and FIG. 6. Therefore, the energy storage 7 connected to the DC wiring 6 is preferred to have only a minimum necessary capacity, which makes it possible to suppress an increase in the size of the energy storage 7. For this reason, the energy storage 7 may be constituted by, for example, a secondary battery. Alternatively, the energy storage 7 may be constituted by an electric double-layer capacitor.

In a conventional power conversion device capable of adjusting power supply and demand, such as the one disclosed in Patent Literature 2, an energy storage connected to the direct current side needs to have a great capacity. Therefore, if such a power conversion device is directly applied to a generator power supply system of, for example, a mobile vehicle to perform load power compensation, the system becomes large-sized, which is not preferable in some cases. On the other hand, in the case of using the power conversion device 4 of the present embodiment, the energy storage 7 connected to the DC wiring 6 is preferred to have only a minimum necessary capacity as mentioned above. Therefore, the power conversion device 4 of the present embodiment is more suitably applicable as a power conversion device for suppressing a load variation in the power supply system 1, which has a size limitation.

Next, a power conversion device according to another exemplary embodiment of the present disclosure is described. In the present embodiment, the same configuration elements as those described in the embodiment above are denoted by the same reference signs as those used above, and the description of such configuration elements is omitted.

Figure 10:
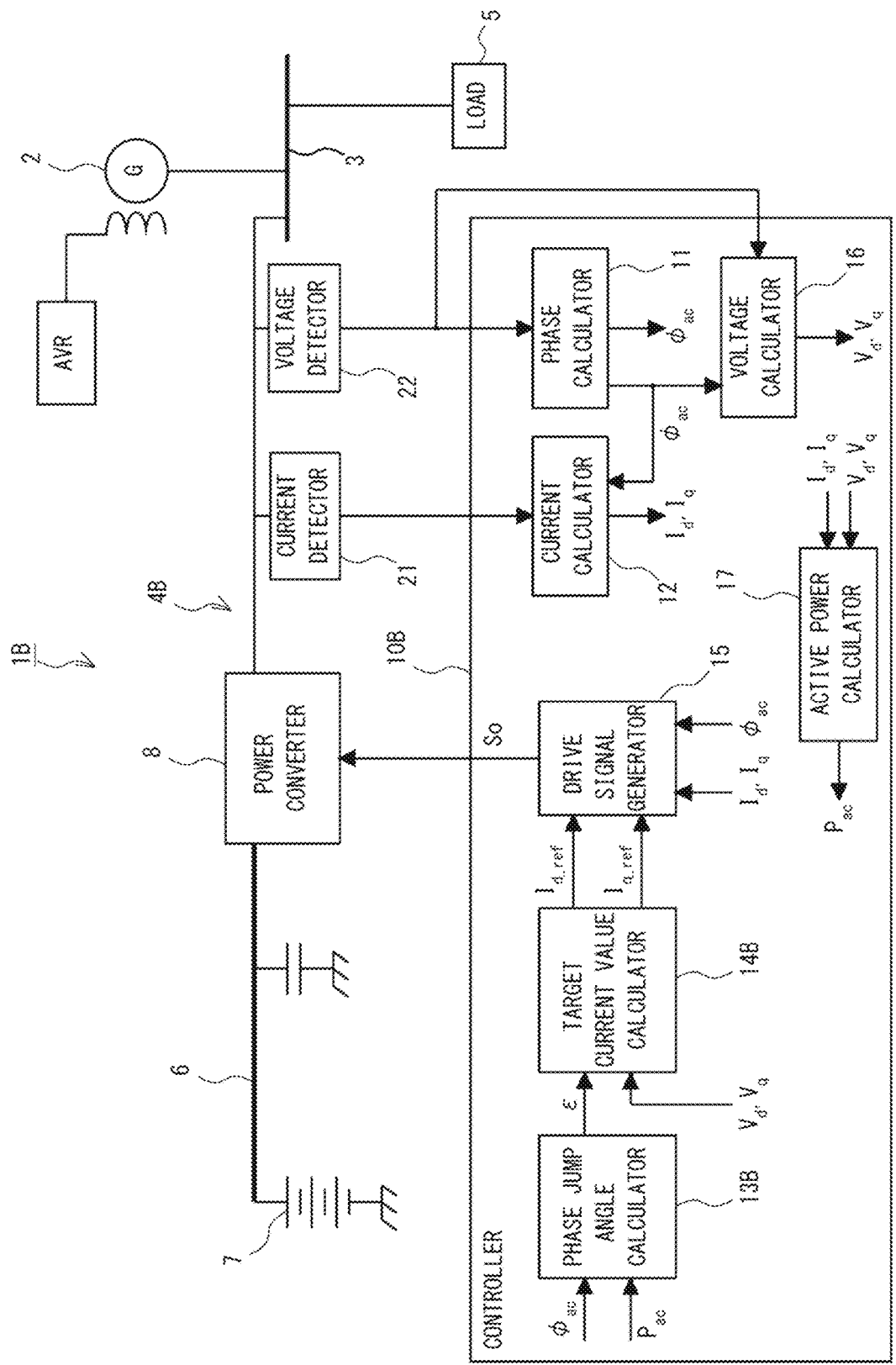
FIG. 10 is a block diagram showing a schematic configuration of a control system of a power conversion device according to an exemplary embodiment of the present disclosure.

FIG. 10 is a block diagram showing a schematic configuration of a control system of the power conversion device according to this exemplary embodiment of the present disclosure. A power conversion device 4B of the present embodiment also includes the power converter 8, the current detector 21, the voltage detector 22, and a controller 10B. The controller 10B is also configured as a controller of a current-control type.

The controller 10B of the present embodiment is different from the controller 10 of the previous exemplary embodiment in that the controller 10B performs virtual synchronous phase modifier model control of the power converter 8. The virtual synchronous phase modifier model control is defined herein as a control mode that is on an assumption that a virtual synchronous phase modifier is connected instead of the power conversion device 4B, and based on the assumption, arithmetic operations are performed. Specifically, a value based on a virtual inertia moment (an inertia constant), an impedance (a reactance), and an internal electromotive force voltage in the virtual synchronous phase modifier are stored in the controller 10B as operation parameters. It should be noted that the virtual synchronous phase modifier in the present embodiment does not have a virtual motive power source, and an exciting voltage Ef is a fixed value (in this example, 1 PU (Per Unit)). Accordingly, the power conversion device 4B equivalently acts as a synchronous phase modifier with a constant exciting voltage.

Similar to the controller 10 of the previous exemplary embodiment, the controller 10B of the present embodiment also includes the phase calculator 11, the current calculator 12, and the drive signal generator 15. The controller 10B further includes a phase jump angle calculator 13B instead of the phase jump angle calculator 13 of the previous exemplary embodiment. The phase jump angle calculator 13B includes an angular velocity calculator 41 and an integrator 42. The angular velocity calculator 41 calculates an angular velocity $\omega_V$ in the virtual synchronous phase modifier by using active power $P_{ac}$ of the AC wiring 3 and a value (an inertia constant $M_V$) that is based on a virtual inertia moment in the virtual synchronous phase modifier. The integrator 42 calculates, as a virtual phase $\varphi$, a phase in the virtual synchronous phase modifier by integrating the angular velocity $\omega_V$.

The controller 10B further includes a target current value calculator 14B instead of the target current value calculator 14 of the previous exemplary embodiment. The target current value calculator 14B calculates target current values $I_{d\_ref}$ and $I_{q\_ref}$ from voltage differences $\Delta V_d$ and $\Delta V_q$ between internal electromotive force voltages $Ef_d$ and $Ef_q$ in the virtual synchronous phase modifier and system voltages $V_d$ and $V_q$ detected by the voltage detector 22.

In order to perform these calculations by the phase jump angle calculator 13B and the target current value calculator 14B, the controller 10B further includes a voltage calculator 16 and an active power calculator 17. In the present embodiment, the current detector 21, the voltage detector 22, the phase calculator 11, the current calculator 12, the voltage calculator 16, and the active power calculator 17 constitute an active power obtainer that obtains active power $P_{ac}$ at the AC wiring 3 side of the power converter 8.

[Voltage Calculator]

The voltage calculator 16 calculates voltages of the respective coordinate axes in an AC voltage rotating coordinate system (i.e., d-axis voltage $V_d$ and q-axis voltage $V_q$) from the current phase $\varphi_{ac}$ calculated by the phase calculator 11, by using an equation shown below.

[Math. 5]

$$\begin{bmatrix} V_d \\ V_q \end{bmatrix} = \sqrt{\frac{2}{3}} \begin{bmatrix} \cos\phi_{ac} & \cos\left(\phi_{ac} - \frac{2}{3}\pi\right) & \cos\left(\phi_{ac} - \frac{4}{3}\pi\right) \\ -\sin\phi_{ac} & -\sin\left(\phi_{ac} - \frac{2}{3}\pi\right) & -\sin\left(\phi_{ac} - \frac{4}{3}\pi\right) \end{bmatrix} \begin{bmatrix} v_a \\ v_b \\ v_c \end{bmatrix} \quad (5)$$

[Active Power Calculator]

The active power calculator 17 calculates active power $P_{ac}$ and reactive power $Q_{ac}$, which are outputted from the power converter 8 to the AC wiring 3, from voltages $V_d$ and $V_q$ calculated by the voltage calculator 16 and electric currents $I_d$ and $I_q$ calculated by the current calculator 12, by using equations shown below. It should be noted that since the reactive power $Q_{ac}$ is not used in the present embodiment, the calculation of the reactive power $Q_{ac}$ need not be performed

[Math. 6]

$$P_{sc} = V_d \cdot I_d + V_q \cdot I_q \quad (6)$$
$$Q_{ac} = -(V_d \cdot I_q - V_q \cdot I_d)$$

[Phase Jump Angle Calculator]

Figure 11:
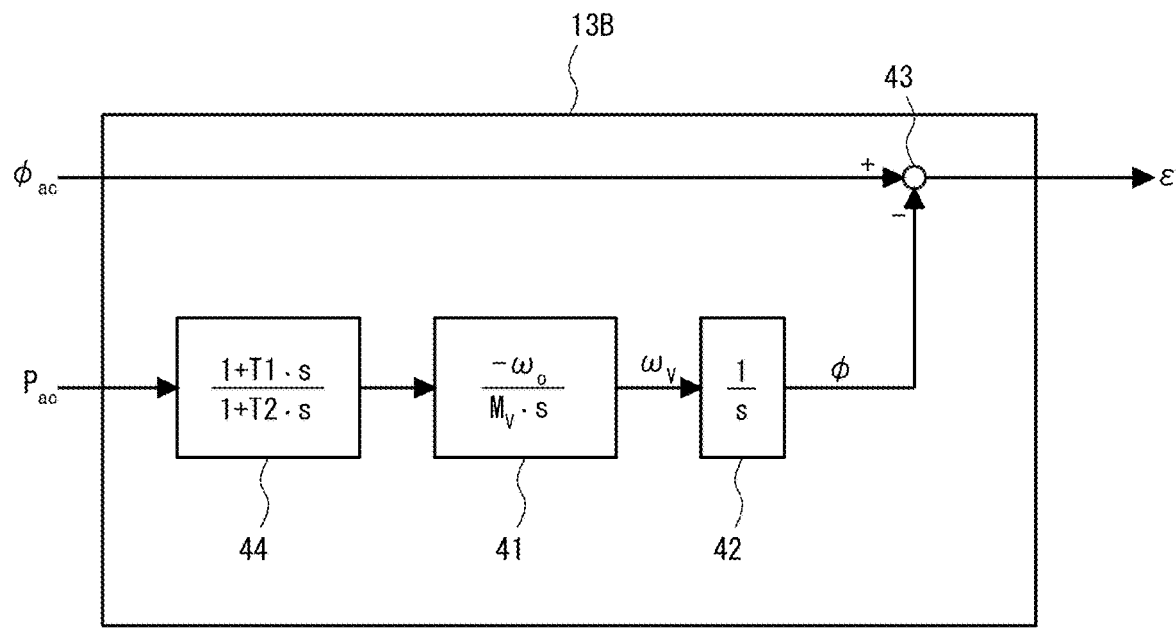
FIG. 11 shows one exemplary mode of calculation performed by a phase jump angle calculator of the present embodiment.

FIG. 11 shows one exemplary mode of calculation performed by the phase jump angle calculator of the present embodiment. The current phase $\varphi_{ac}$ and the active power $P_{ac}$ are inputted to the phase jump angle calculator 13B of the present embodiment. The active power $P_{ac}$ is inputted to a phase compensator 44 described below. The phase compensator 44 outputs phase-compensated active power, which is inputted to the angular velocity calculator 41.

The angular velocity calculator 41 applies a transfer function $G_2(s)$ to the phase-compensated active power. The transfer function $G_2(s)$ is represented by an equation shown below. In the equation, $\omega_o$ is an angular velocity in a steady state, and $M_V$ is an inertia constant that is based on an inertia moment in the virtual synchronous phase modifier.

[Math. 7]

$$G_2(s) = -\frac{\omega_o}{M_v \cdot s} \quad (7)$$

When a change in active power is $\Delta P_{ac}$, the relationship between the active power change $\Delta P_{ac}$ and the angular velocity $\omega_V$ in the virtual synchronous phase modifier is represented by an equation shown below.

[Math. 8]

$$\Delta P_{ac} = -M_v \frac{d\omega_v}{dt} \quad (8)$$

This means that when the power converter 8 supplies electric power to the AC wiring 3, the angular velocity $\omega$ decreases, whereas when the power converter 8 absorbs electric power from the AC wiring 3, the angular velocity $\omega_V$ increases. Therefore, the transfer function $G_2(s)$ in Math. 7 is, in other words, a function of integrating the active power $P_{ac}$ to calculate the degree of increase/decrease in the angular velocity $\omega_V$, thereby calculating the angular velocity $\omega_V$.

The angular velocity $\omega v$ calculated by the angular velocity calculator 41 is integrated by the integrator 42, and thereby the phase in the virtual synchronous phase modifier is calculated. Consequently, the phase jump angle calculator 13B of the present embodiment is configured to integrate the active power $P_{ac}$ twice by the angular velocity calculator 41 and the integrator 42. In the present embodiment, the output from the integrator 42 is used as the virtual phase $\varphi$.

The current phase $\varphi_{ac}$ and the virtual phase $\varphi$ are inputted to a subtracter 43. The phase jump angle calculator 13B outputs a phase difference $\varphi_{ac}-\varphi$ that is obtained by subtraction by the subtracter 43 as a phase jump angle $\varepsilon$.

According to this configuration, when the power conversion device 4B is replaced with the virtual synchronous phase modifier, the virtual phase $\varphi$, which follows temporal changes in the current phase $\varphi_{ac}$ in a lagging manner, can be calculated relatively easily by taking account of a value (inertia constant $M_V$) that is based on a virtual inertia moment occurring in the virtual synchronous phase modifier.

In the present embodiment, the phase jump angle calculator 13B includes the phase compensator 44, which phase-compensates the active power $P_{ac}$ before the angular velocity calculator 41 calculates the angular velocity $\omega v$ from the active power $P_{ac}$.

The virtual synchronous phase modifier model adopted by the present embodiment causes the power converter 8 to operate on an assumption that synchronizing power occurs between the power converter 8 and the power generator 2 (the AC wiring 3). The virtual synchronous phase modifier at the time is an ideal synchronizer, and has no damping element. For this reason, it is possible that a response to the active power $P_{ac}$, which is a feedback element, becomes oscillating. In this respect, by phase-compensating the active power $P_{ac}$ inputted to the phase jump angle calculator 13B, a damping effect can be in advance added to the active power $P_{ac}$, which is used for calculating the virtual phase φ. Therefore, an electric power compensation response to a load variation can be prevented from becoming oscillating.

[Target Current Value Calculator]

Figure 12:
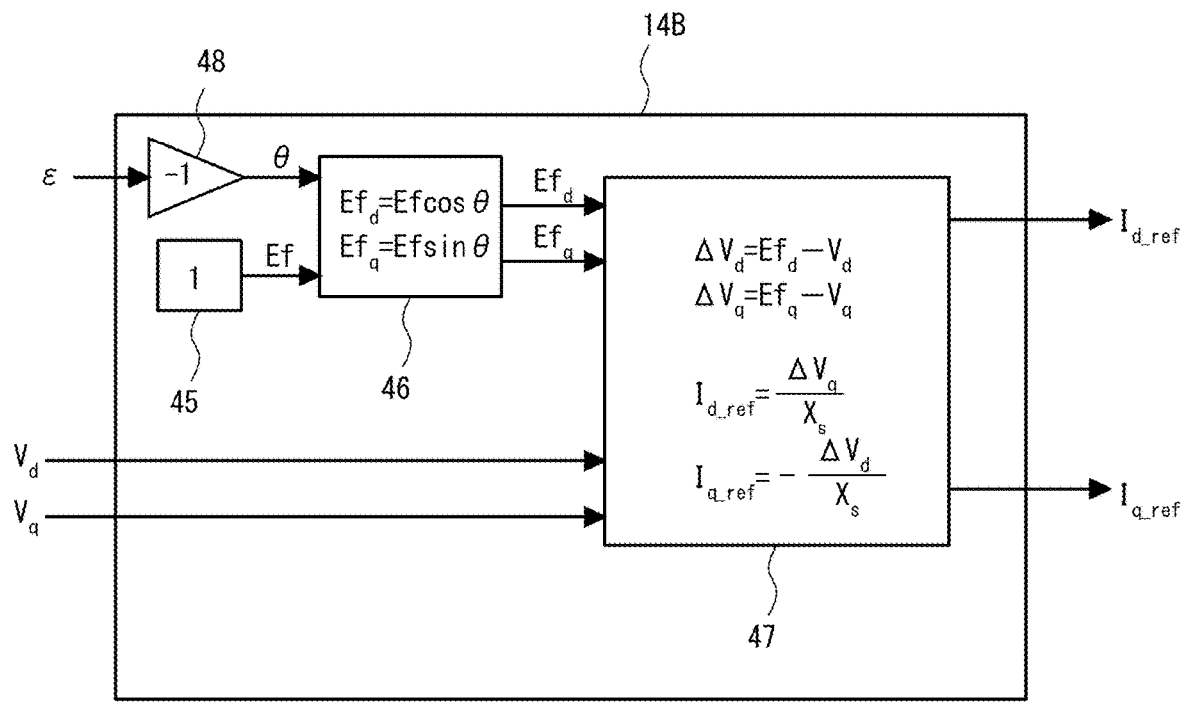
FIG. 12 shows one exemplary mode of calculation performed by a target current value calculator of the present embodiment.

FIG. 12 shows one exemplary mode of calculation performed by the target current value calculator of the present embodiment. The phase jump angle ε and the voltages $V_d$ and $V_q$ are inputted to the target current value calculator 14B of the present embodiment. A multiplier 48 multiplies the phase jump angle ε by −1 (i.e., sign inversion), and outputs an inversion amount θ=−ε. The inversion amount θ of the phase jump angle ε is inputted to an internal electromotive force voltage calculator 46.

The internal electromotive force voltage calculator 46 calculates internal electromotive force voltages $Ef_d$ and $Ef_q$ of the virtual synchronous phase modifier from the exciting voltage Ef (=1 PU) in the virtual synchronous phase modifier and the inversion amount θ of the phase jump angle ε. The internal electromotive force voltages $Ef_d$ and $Ef_q$ are represented by equations shown below.

[Math. 9]

$$Ef_d = Ef \cos\theta \quad (9)$$
$$Ef_q = Ef \sin\theta$$

The calculated internal electromotive force voltages $Ef_d$ and $Ef_q$ and the voltages $V_d$ and $V_q$ calculated by the voltage calculator 16 are inputted to an impedance model calculator 47. The impedance model calculator 47 calculates voltage differences $\Delta V_d$ and $\Delta V_q$ by using equations shown below. Each of the voltage differences $\Delta V_d$ and $\Delta V_q$ is a voltage drop due to a virtual impedance in the virtual synchronous phase modifier.

[Math. 10]

$$\Delta V_d = Ef_d - V_d \quad (10)$$
$$\Delta V_q = Ef_q - V_q$$

The impedance model calculator 47 further calculates target current values $I_{d\_ref}$ and $I_{q\_ref}$ from the obtained voltage differences $\Delta V_d$ and $\Delta V_q$ and a value $X_s$ by using equations shown below. The value $X_s$ is based on a virtual reactance in the virtual synchronous phase modifier.

[Math. 11]

$$I_{d\_ref} = \frac{\Delta V_q}{X_s} \quad (11)$$
$$I_{q\_ref} = \frac{\Delta V_d}{X_s}$$

Also in the present embodiment, the drive signal generator 15 generates the drive signal So to the power converter 8, which is a signal for adjusting active power that is inputted to/outputted from the power converter 8 so as to suppress the phase jump angle ε. To be more specific, the controller 10B generates the drive signal So for performing feedback control such that the alternating currents $I_d$ and $I_q$ outputted from the power converter 8 to the AC wiring 3 are adjusted to the target current values $I_{d\_ref}$ and $I_{q\_ref}$ calculated by the target current value calculator 14B.

Also in the above configuration, a load variation is detected depending on the phase jump angle ε, which is calculated based on temporal changes in the phase $\varphi_{ac}$ of the AC wiring 3. The controller 10B controls the power converter 8 such that in a case where the phase jump angle ε occurs in the leading direction, the power converter 8 absorbs the active power of the AC wiring 3, whereas in a case where the phase jump angle ε occurs in the lagging direction, the power converter 8 supplies active power to the AC wiring 3. In this manner, a power variation, a voltage variation, and a phase jump of the AC wiring 3 due to a load variation are suppressed.

Further, in the present embodiment, the target current value calculator 14B calculates an active current component $I_{d\_ref}$ and a reactive current component $I_{q\_ref}$ each as a target current value. Accordingly, the drive signal So to the power converter 8, which is outputted from the drive signal generator 15, is configured as a drive signal for adjusting active power that is inputted to/outputted from the power converter 8 so as to suppress the phase jump angle ε by using the calculated active current component $I_{d\_ref}$ and for adjusting reactive power that is inputted to/outputted from the power converter 8 so as to suppress a voltage variation, more specifically a voltage amplitude variation, by using the calculated reactive current component $I_{q\_ref}$. Therefore, according to the power conversion device 4B of the present embodiment, electric power compensation for a load variation can be performed not only for active power components, but also for reactive power components. This makes it possible to further suppress the voltage variation in the AC wiring 3.

[Simulation Results]

Figure 13:
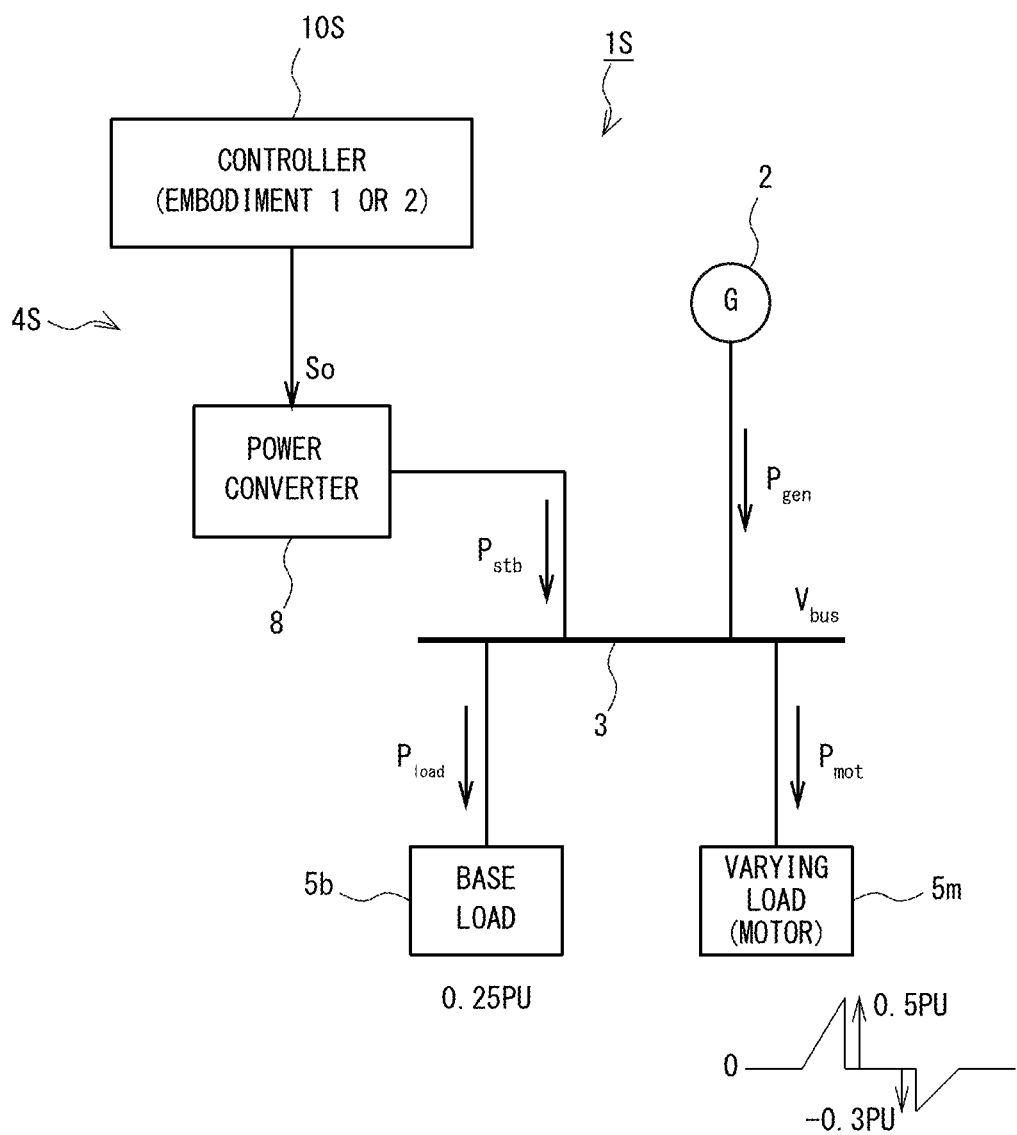
FIG. 13 is a block diagram showing a power supply system configuration example for simulation.

Hereinafter, the results of simulation on the power conversion devices 4 and 4B are described. FIG. 13 is a block diagram showing a power supply system configuration example for the simulation. In FIG. 13, the same configuration elements as those shown in FIG. 1 are denoted by the same reference signs as those used in FIG. 1, and the description of such configuration elements is omitted.

In the simulation below, as shown in FIG. 13, a power supply system 1S is used, in which two loads 5b and $5_m$ are connected to the AC wiring 3. Of the two loads, the base load 5b simulates, for example, a resistor, and is a steady load in which no load variation occurs. In the simulation, in a case where the voltage (system voltage) $V_{bus}$ of the AC wiring 3 in a steady state is 1 PU, the base load 5b is 0.25 PU.

Of the two loads, the varying load 5m simulates, for example, a motor, and is a load in which load variations occur. In the simulation, when 0.1 seconds have elapsed from the start of the simulation, powering (consumption of electric power) is performed for about 0.06 seconds, and then, when 0.5 seconds have elapsed from the start of the simulation, regeneration (generation of electric power) is performed for about 0.06 seconds. In the simulation, in a case where the voltage (system voltage) $V_{bus}$ of the AC wiring 3 in a steady state is 1 PU, the peak during the powering is 0.5 PU, and the peak during the regeneration is −0.3 PU. The power generator 2 operates constantly at a predetermined frequency.

A controller 10S of a power conversion device 4S in the simulation functions in Example 1 as the controller 10 of the previous exemplary embodiment, and functions in Example 2 as the controller 10B of this exemplary embodiment. Examples 1 and 2 will be described below. In Examples 1 and 2, load variations of the varying load 5m are caused in the above-described manner, and simulation results obtained in Examples 1 and 2 are compared with simulation results obtained in Comparative Example in which electric power compensation is not performed.

Comparative Example

Figure 14:
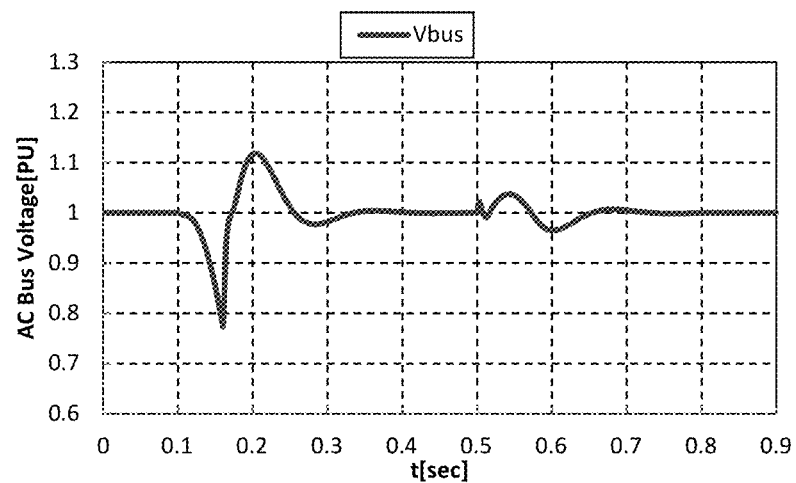
FIG. 14 is a graph showing simulation results in a case where electric power compensation is not performed.
Figure 15:
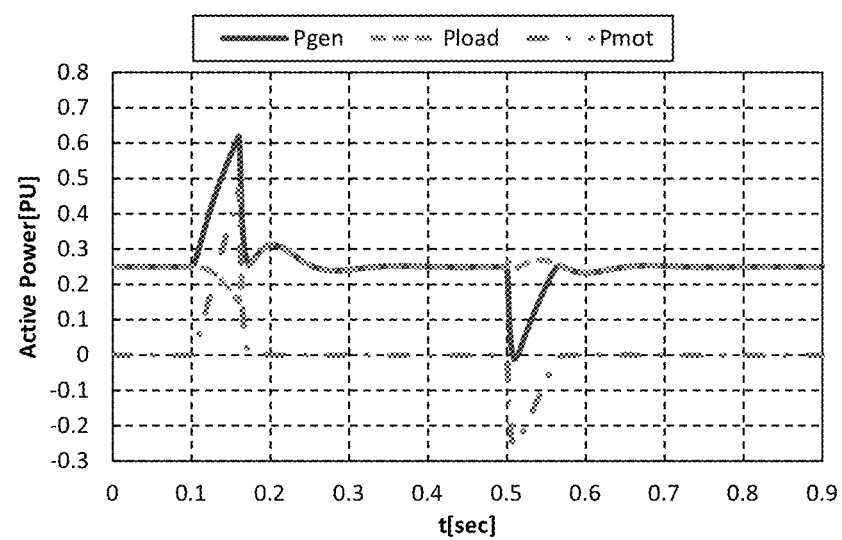
FIG. 15 is a graph showing simulation results in the case where electric power compensation is not performed.
Figure 16:
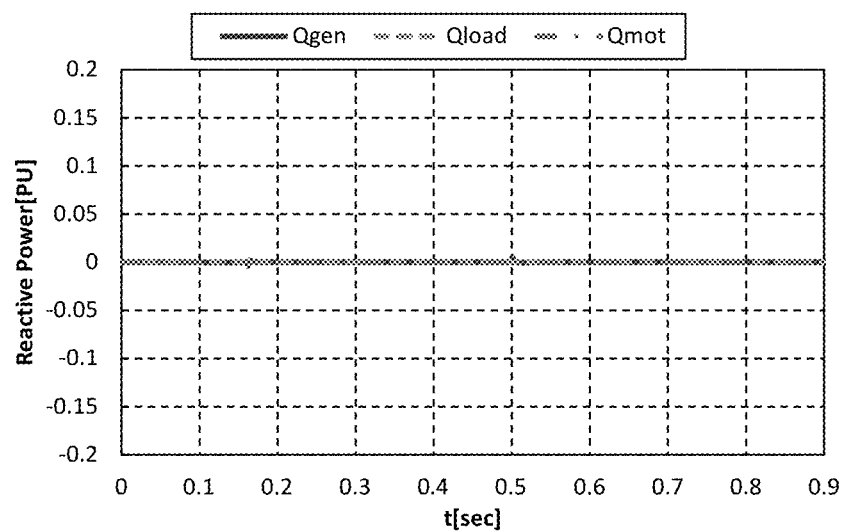
FIG. 16 is a graph showing simulation results in the case where electric power compensation is not performed.

Comparative Example is the simulation in a case where electric power compensation is not performed in the power supply system 1S of FIG. 13. FIG. 14 to FIG. 16 are graphs showing simulation results in the case where electric power compensation is not performed. FIG. 14 is a graph showing temporal changes in the system voltage $V_{bus}$. FIG. 15 is a graph showing temporal changes in various active powers $P_{gen}$, $P_{load}$, and $P_{mot}$. FIG. 16 is a graph showing temporal changes in various reactive powers $Q_{gen}$, $Q_{load}$, and $Q_{mot}$.

As shown in FIG. 14, as a result of a load variation occurring in the varying load 5m due to the powering, the system voltage $V_{bus}$ decreases rapidly from 1 PU, and thereafter increases to become higher than 1 PU. This is because, as shown in FIG. 2, the load current I of the varying load 5m increases rapidly due to the start of the powering, and in accordance therewith, the voltage decreases. Then, when the powering ends, the load current I of the varying load 5m decreases rapidly, and consequently, the voltage increases. In FIG. 14, similarly, as a result of a load variation occurring in the varying load 5m due to the regeneration, the system voltage $V_{bus}$ varies (increases and decreases).

In FIG. 15, varying load active power $P_{mot}$ of the varying load 5m indicates the load variations. During the powering, the varying load active power $P_{mot}$ increases by approximately 0.45 PU, and consequently, the power generator active power $P_{gen}$ also increases by approximately 0.4 PU. The base load active power $P_{load}$ also varies, which indicates that the influence of the varying load 5m affects the base load 5b. The same is true for the load variation that occurs due to the regeneration.

As shown in FIG. 16, in this simulation, since there is no phase difference between the system current and the system voltage, the reactive powers $Q_{gen}$, $Q_{load}$, and $Q_{mod}$ are substantially kept constant regardless of the load variations occurring in the varying load 5m.

Example 1

Figure 17:
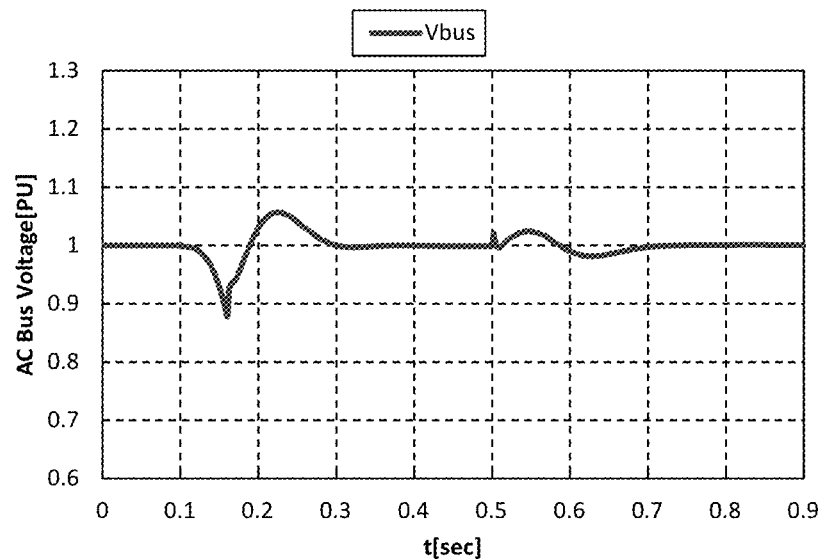
FIG. 17 is a graph showing simulation results in a case where electric power compensation of an exemplary embodiment is performed.
Figure 18:
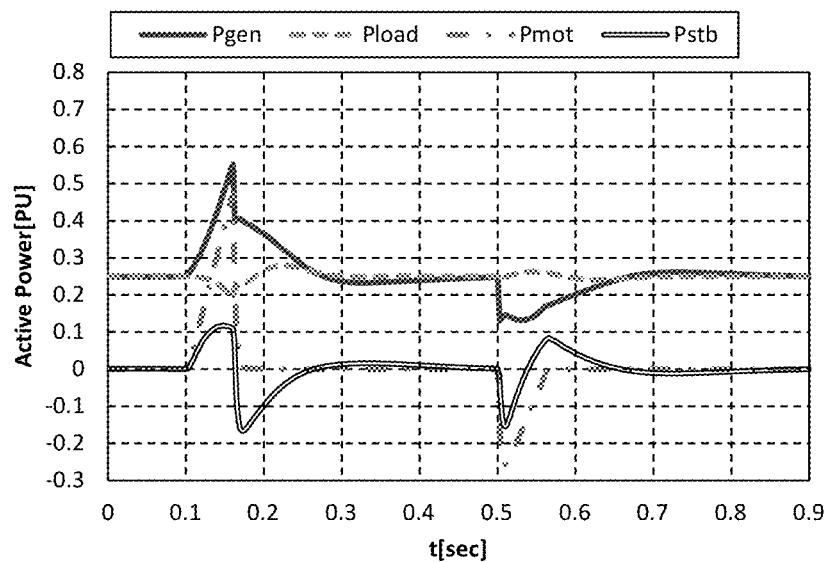
FIG. 18 is a graph showing simulation results in the case where the electric power compensation of an exemplary embodiment is performed.
Figure 19:
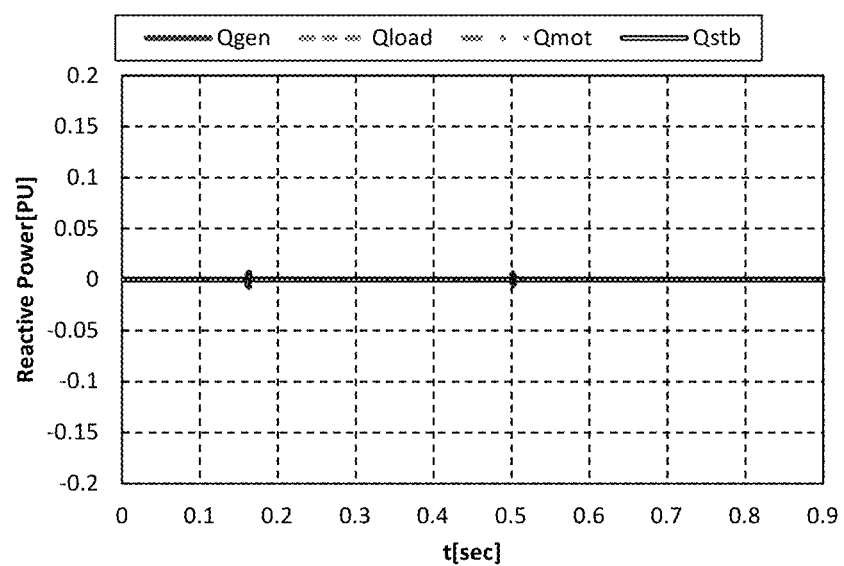
FIG. 19 is a graph showing simulation results in the case where the electric power compensation of an exemplary embodiment is performed.

Example 1 is the simulation in a case where the electric power compensation based on the control mode of the previous exemplary embodiment is performed in the power supply system 1S of FIG. 13. FIG. 17 to FIG. 19 are graphs showing simulation results in the case where the electric power compensation of the previous exemplary embodiment is performed. FIG. 17 to FIG. 19 in Example 1 correspond to FIG. 14 to FIG. 16 in the Comparative Example. FIG. 17 is a graph showing temporal changes in the system voltage $V_{bus}$. FIG. 18 is a graph showing temporal changes in various active powers $P_{gen}$, $P_{load}$, $P_{mot}$, and $P_{stb}$. FIG. 19 is a graph showing temporal changes in various reactive powers $Q_{gen}$, $Q_{load}$, $Q_{mot}$, and $Q_{stb}$.

As shown in FIG. 17, even in the case where the electric power compensation based on the control mode of the previous exemplary embodiment is performed, the system voltage $V_{bus}$ still varies as a result of the load variation occurring in the varying load 5m due to the powering. However, the variation range in this case is sufficiently less than the variation range in the Comparative Example shown in FIG. 14, in which electric power compensation is not performed. This indicates that the voltage variation due to the load variation is suppressed by the electric power compensation.

It is understood from FIG. 18 that, also in Example 1, the varying load active power $P_{mot}$ of the varying load 5m changes in the same manner as in the Comparative Example shown in FIG. 15 (i.e., the same load variations occur). However, it is understood that, in Example 1, changes in the power generator active power $P_{gen}$ that occur in accordance with the changes in the varying load active power $P_{mot}$ are less than those in the Comparative Example.

Power conversion device active power $P_{stb}$ in FIG. 18 indicates active power outputted from the power converter 8. Positive values indicate that active power is supplied to the AC wiring 3, whereas negative values indicate that active power is absorbed from the AC wiring 3. FIG. 18 shows that when the varying load active power $P_{mot}$ increases rapidly at the start of the powering, the power conversion device active power $P_{stb}$ becomes a positive value. Therefore, it is understood that the power converter 8 supplies active power to the AC wiring 3 in accordance with the rapid increase in the varying load active power $P_{mot}$. Consequently, the maximum increase amount of the power generator active power $P_{gen}$, and the increase amount of the power generator active power $P_{gen}$ per unit time, are reduced compared to the Comparative Example.

FIG. 18 also shows that when the varying load active power $P_{mot}$ decreases rapidly at the end of the powering, the power conversion device active power $P_{stb}$ becomes a negative value. Therefore, it is understood that the power converter 8 absorbs active power from the AC wiring 3 in accordance with the rapid decrease in the varying load active power $P_{mot}$. Consequently, the decrease amount of the power generator active power $P_{gen}$ per unit time is reduced compared to the Comparative Example.

Similarly, in the case of performing the regeneration, the power conversion device active power $P_{stb}$ becomes a positive value at the start of the regeneration, and the power conversion device active power $P_{stb}$ becomes a negative value at the end of the regeneration. Consequently, the maximum change amount of the power generator active power $P_{gen}$, and the change amount of the power generator active power $P_{gen}$ per unit time, are reduced compared to the Comparative Example.

As described above, the waveform of the power generator active power $P_{gen}$ in Example 1 has a smaller peak and a wider full width at half maximum than the waveform of the varying load active power $P_{mot}$ and the waveform of the power generator active power $P_{gen}$ in the Comparative Example, in which electric power compensation is not performed.

It is understood from the above that by performing the electric power compensation based on the control mode of the previous exemplary embodiment for the load variations of the varying load 5m, the variation range (the maximum value) of the active power $P_{gen}$, and the variation range of the active power $P_{gen}$ per unit time, are both reduced in the power generator 2. At the time, a time during which the power conversion device 4 supplies electric power to the AC wiring 3 (i.e., a time during which $P_{stb}$ takes a positive value), or a time during which electric power is supplied from the AC wiring 3 (i.e., a time during which $P_{stb}$ takes a negative value), in order to perform the electric power compensation is approximately 0.1 seconds. For this reason, the energy storage 7 connected to the power conversion device 4S need not have a great capacity. The energy storage 7 can be realized by an energy storage having a minimum necessary capacity.

It should be noted that, as shown in FIG. 19, since no control is performed on reactive power components in the control mode of the embodiment described above, the reactive powers $Q_{gen}$, $Q_{load}$, $Q_{mot}$, and $Q_{stb}$ are substantially kept constant as with the Comparative Example.

Example 2

Figure 20:
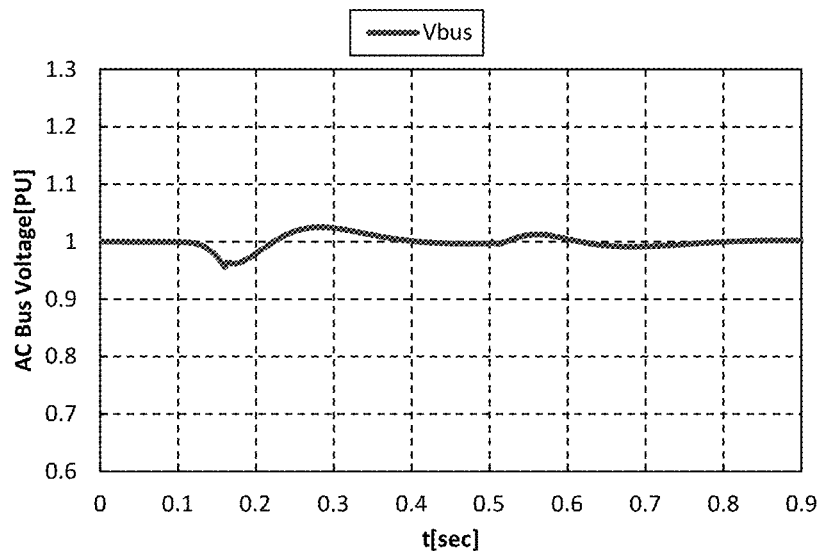
FIG. 20 is a graph showing simulation results in a case where electric power compensation of an exemplary embodiment is performed.
Figure 21:
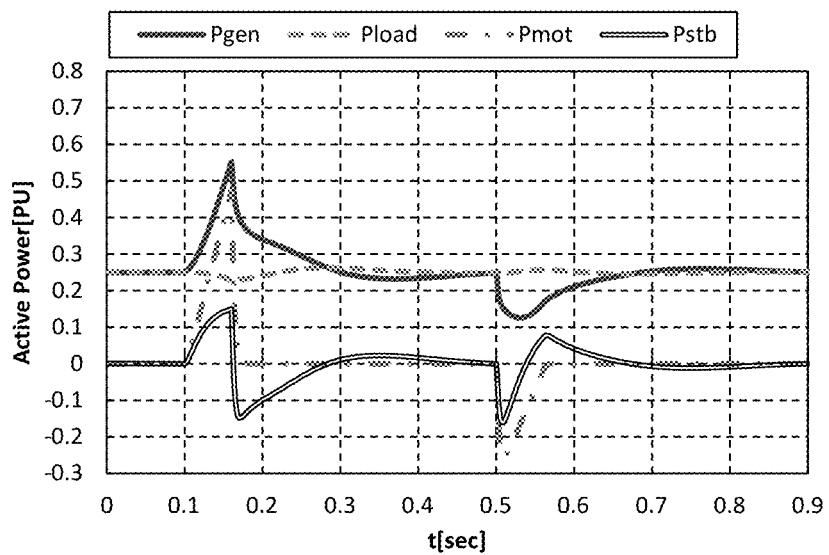
FIG. 21 is a graph showing simulation results in the case where the electric power compensation of an exemplary embodiment is performed.
Figure 22:
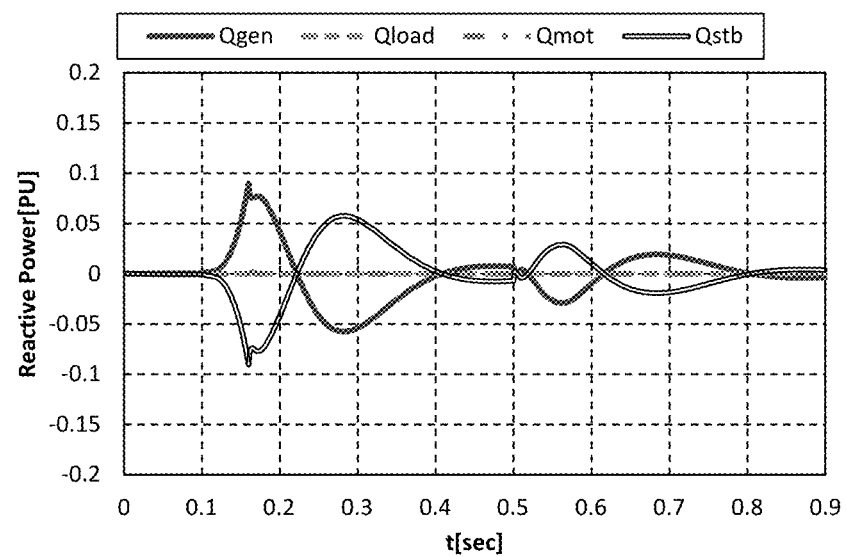
FIG. 22 is a graph showing simulation results in the case where the electric power compensation of an exemplary embodiment is performed.

Example 2 is the simulation in a case where the electric power compensation based on the control mode of this exemplary embodiment is performed in the power supply system 1S of FIG. 13. FIG. 20 to FIG. 22 are graphs showing simulation results in the case where the electric power compensation of this exemplary embodiment is performed. FIG. 20 to FIG. 22 in Example 2 correspond to FIG. 14 to FIG. 16 in the Comparative Example. FIG. 20 is a graph showing temporal changes in the system voltage $V_{bus}$. FIG. 21 is a graph showing temporal changes in various active powers $P_{gen}$, $P_{load}$, $P_{mot}$, and $P_{stb}$. FIG. 22 is a graph showing temporal changes in various reactive powers $Q_{gen}$, $Q_{load}$, $Q_{mot}$, and $Q_{stb}$.

As shown in FIG. 21, the waveforms of the respective active powers $P_{gen}$, $P_{load}$, $P_{mot}$, and $P_{stb}$ in Example 2 are substantially the same as those waveforms in Example 1. Therefore, it is understood that by performing the electric power compensation based on the control mode of this exemplary embodiment for the load variations of the varying load 5m, the variation range (the maximum value) of the active power $P_{gen}$, and the variation range of the active power $P_{gen}$ per unit time, are both reduced in the power generator 2.

It should be noted that, in Example 2, in the phase jump angle calculator 13B, the active power $P_{ac}$ is phase-compensated before the angular velocity $\omega_V$ is calculated by using the active power $P_{ac}$. According to FIG. 21, the power conversion device active power $P_{stb}$ and the power generator active power $P_{gen}$ converge within a short period of time, which is as short as in Example 1, without becoming oscillating for the load variations. Accordingly, it is understood that, in the previous exemplary embodiment, even when feedback control of the active power $P_{ac}$ is performed with use of the virtual synchronous phase modifier model having no damping element, since the active power $P_{ac}$ is phase-compensated, an electric power compensation response to a load variation is prevented from becoming oscillating.

Further, in Example 2, the electric power compensation is performed not only for active power components, but also for reactive power components. As shown in FIG. 21 and FIG. 22, the power conversion device reactive power $Q_{stb}$ changes in accordance with changes in the power conversion device active power $P_{stb}$. As shown in FIG. 22, the power generator reactive power $Q_{gen}$ changes in accordance with changes in the power conversion device reactive power $Q_{stb}$. The power generator reactive power $Q_{gen}$ has a waveform inverted from the waveform of the power conversion device reactive power $Q_{stb}$.

As described above, in Example 2, the electric power compensation is performed for both active and reactive power components. Consequently, as shown in FIG. 20, the variation range of the system voltage $V_{bus}$ is less than that in Example 1 shown in FIG. 17, in which the electric power compensation is performed only for active power components. From this, it is understood that since the electric power compensation is performed also for reactive power components, voltage variations (voltage amplitude variations) due to the load variations are further suppressed.

OTHER EMBODIMENTS

Although the embodiments of the present disclosure have been described above, the present disclosure is not limited to the above embodiments, and various improvements, alterations, and modifications can be made to the above embodiments without departing from the scope of the present disclosure.

For example, the above embodiments have described the case in which the AC wiring 3 in the power supply system to which the power conversion device is applied is a three-phase system. However, the present disclosure is not thus limited. For example, even in a case where the AC wiring 3 in the power supply system is a single-phase two-wire system or a single-phase three-wire system, the same power conversion devices as those described in the above embodiments are each applicable to such a power supply system, although in such a case, methods by which to perform the various calculations differ in accordance with the type of the system of the AC wiring 3.

The above embodiments have described the examples in which one power generator 2 is connected to one AC wiring 3. Alternatively, two or more power generators 2 may be connected to one AC wiring 3.

The power conversion device of the present disclosure is suitably applicable to any power supply system including a power generator, for example, applicable to power supply systems of mobile vehicles, such as hybrid propulsion ships, normal ships, and aircrafts, private power generation systems, etc.

At least part of the configuration (the control mode) of the previous exemplary embodiment and at least part of the configuration (the control mode) of this exemplary embodiment may be combined with each other. As one example, the controller may be configured in such a manner that the phase jump angle calculator 13 of the previous exemplary embodiment and the target current value calculator 14B of this embodiment are combined with each other. As another example, the controller may be configured in such a manner that the phase jump angle calculator 13B of this embodiment and the target current value calculator 14 of the previous exemplary embodiment are combined with each other.

In the above-described embodiments, a variable-frequency power generator is taken as one example of the power generator 2. The power conversion device of the present disclosure is applicable also to a power supply system that includes a power generator different from a variable-frequency power generator (e.g., a frequency-controllable power generator).

Summarizing the above, a power conversion device according to one aspect of the present disclosure includes: a power converter disposed between AC wiring, to which a power generator and an electrical load are connected, and DC wiring, to which an energy storage is connected, the power converter being configured to convert AC power inputted to the power converter through the AC wiring into DC power and charge the energy storage with the DC power, and to convert DC power inputted to the power converter through the DC wiring, the DC power being discharged from the energy storage, into AC power and output the AC power to the AC wiring; a voltage detector that detects a system voltage at the AC wiring side of the power converter; and a controller that performs power conversion control between the AC wiring and the DC wiring by transmitting a drive signal to the power converter. The controller includes: a phase calculator that calculates a current phase from the system voltage detected by the voltage detector; a phase jump angle calculator that calculates a virtual phase that follows temporal changes in the current phase in a lagging manner, and calculates a phase difference between the current phase and the virtual phase as a phase jump angle; and a drive signal generator that generates the drive signal to the power converter, which is a signal for adjusting active power that is inputted to/outputted from the power converter so as to suppress the phase jump angle.

According to the above configuration, a load variation is detected depending on the phase jump angle, which is calculated based on temporal changes in the phase of the AC wiring. The phase jump angle indicates a change in an internal phase difference angle of the power generator, and is a value dependent on an active power load of the power generator. Therefore, by adjusting the active power that is inputted to/outputted from the power converter based on the phase jump angle, electric power compensation for the load variation can be performed without depending on a frequency variation.

The phase jump angle calculator may be configured to calculate the virtual phase by integrating twice the phase jump angle in a past time.

The phase jump angle calculator may include: an estimator that estimates a past system frequency of the AC wiring from the phase jump angle in a past time; and an integrator that calculates, as the virtual phase, a past phase by integrating the estimated past system frequency. According to this configuration, by performing the calculation of estimating the past phase, the virtual phase, which follows temporal changes in the current phase in a lagging manner, can be calculated from the current phase by relatively easy calculation.

The power conversion device may include an active power obtainer that obtains active power at the AC wiring side of the power converter. The phase jump angle calculator may include: an angular velocity calculator that calculates, on an assumption that a virtual synchronous phase modifier is connected instead of the power conversion device, an angular velocity in the virtual synchronous phase modifier by using the obtained active power and a value that is based on a virtual inertia moment in the virtual synchronous phase modifier; and an integrator that calculates, as the virtual phase, a phase in the virtual synchronous phase modifier by integrating the angular velocity. According to this configuration, when the power conversion device is replaced with the virtual synchronous phase modifier, by taking account of the virtual inertia moment that occurs in the virtual synchronous phase modifier, the virtual phase, which follows temporal changes in the current phase in a lagging manner, can be calculated relatively easily.

The phase jump angle calculator may include a phase compensator that phase-compensates the active power, and the phase jump angle calculator may be configured to input the phase-compensated active power to the angular velocity calculator. According to this configuration, by means of the phase compensator, a damping effect can be in advance added to the active power, which is used for calculating the virtual phase. Therefore, an electric power compensation response to a load variation can be prevented from becoming oscillating.

The power conversion device may include a target current value calculator that calculates a target current value by applying a predetermined filter to the phase jump angle and multiplying an output from the filter by a predetermined proportional gain. The drive signal generator may generate the drive signal such that an alternating current outputted from the power converter to the AC wiring is adjusted to the target current value. According to this configuration, by applying the filter to the phase jump angle, response characteristics to the phase jump angle can be adjusted, which makes it possible to generate a more optimized drive signal.

The power conversion device may include a target current value calculator that calculates, on an assumption that a virtual synchronous phase modifier is connected instead of the power conversion device, a target current value from a voltage difference between an internal electromotive force voltage in the virtual synchronous phase modifier and the system voltage detected by the voltage detector. The drive signal generator may generate the drive signal such that an alternating current outputted from the power converter to the AC wiring is adjusted to the target current value.

The target current value calculator may be configured to calculate an active current component and a reactive current component each as the target current value. The drive signal generator may be configured to generate the drive signal for adjusting the active power that is inputted to/outputted from the power converter so as to suppress the phase jump angle by using the calculated active current component and for adjusting reactive power that is inputted to/outputted from the power converter so as to suppress a voltage variation by using the calculated reactive current component. According to this configuration, electric power compensation for a load variation can be performed not only for active power components, but also for reactive power components. This makes it possible to further suppress the voltage variation.

The present disclosure makes it possible to perform electric power compensation for a load variation without depending on a frequency variation.

Many modifications and other embodiments of the present disclosure will be apparent to those skilled in the art from the foregoing description. Accordingly, the foregoing description is to be construed as illustrative only, and is provided for the purpose of teaching those skilled in the art the best mode for carrying out the disclosure. The details of the structure and/or function may be varied substantially without departing from the scope of the disclosure.

INDUSTRIAL APPLICABILITY

The present disclosure is useful for performing electric power compensation for a load variation without depending on a frequency variation.

| Reference Signs List | |
|---|---|
| 2 | power generator |
| 3 | AC wiring |
| 4, 4B | power conversion device |
| 5 | load (electrical load) |
| 6 | DC wiring |
| 7 | energy storage |
| 8 | power converter |
| 10, 10B | controller |
| 11 | phase calculator |
| 12 | current calculator (active power obtainer) |
| 13, 13B | phase jump angle calculator |
| 14, 14B | target current value calculator |
| 15 | drive signal generator |
| 17 | active power calculator (active power obtainer) |
| 21 | current detector (active power obtainer) |
| 22 | voltage detector |

-continued

Reference Signs List

| | |
|---|---|
| 32 | estimator |
| 33, 42 | integrator |
| 41 | angular velocity calculator |
| 44 | phase compensator |

The invention claimed is:

1. A power conversion device comprising:
a power converter located between AC wiring, to which a power generator and an electrical load are connected, and DC wiring, to which an energy storage is connected, the power converter is configured to convert AC power inputted to the power converter through the AC wiring into DC power and charge the energy storage with the DC power, and to convert DC power inputted to the power converter through the DC wiring, the DC power is discharged from the energy storage, converted into AC power and the AC power is outputted to the AC wiring;
a voltage detector that detects a system voltage at the AC wiring side of the power converter;
an active power obtainer that obtains active power at the AC wiring side of the power converter; and
circuitry that performs power conversion control between the AC wiring and the DC wiring by transmitting a drive signal to the power converter, wherein
the circuitry includes:
a phase calculator that calculates a current phase from the system voltage detected by the voltage detector;
a phase jump angle calculator that calculates a virtual phase that follows temporal changes in the current phase in a lagging manner, and calculates a phase difference between the current phase and the virtual phase as a phase jump angle; and
a drive signal generator that generates the drive signal to the power converter, which is a signal for adjusting active power that is inputted to or outputted from the power converter so as to suppress the phase jump angle, wherein
the phase jump angle calculator includes:
an angular velocity calculator that calculates, on an assumption that a virtual synchronous phase modifier is connected instead of the power conversion device, an angular velocity in the virtual synchronous phase modifier by using the obtained active power and a value that is based on a virtual inertia moment in the virtual synchronous phase modifier; and
an integrator that calculates, as the virtual phase, a phase in the virtual synchronous phase modifier by integrating the angular velocity.

2. The power conversion device according to claim 1 wherein,
the phase jump angle calculator calculates the virtual phase by integrating twice the phase jump angle in a past time.

3. The power conversion device according to claim 2, comprising a target current value calculator that calculates a target current value by applying a predetermined filter to the phase jump angle and multiplying an output from the filter by a predetermined proportional gain, wherein
the drive signal generator generates the drive signal such that an alternating current outputted from the power converter to the AC wiring is adjusted to the target current value.

4. The power conversion device according to claim 1, wherein
the phase jump angle calculator includes a phase compensator that phase-compensates the active power, and
the phase jump angle calculator inputs the phase-compensated active power to the angular velocity calculator.

5. The power conversion device according to claim 1, comprising a target current value calculator that calculates a target current value by applying a predetermined filter to the phase jump angle and multiplying an output from the filter by a predetermined proportional gain, wherein
the drive signal generator generates the drive signal such that an alternating current outputted from the power converter to the AC wiring is adjusted to the target current value.

6. A power conversion device comprising:
a power converter located between AC wiring, to which a power generator and an electrical load are connected, and DC wiring, to which an energy storage is connected, the power converter is configured to convert AC power inputted to the power converter through the AC wiring into DC power and charge the energy storage with the DC power, and to convert DC power inputted to the power converter through the DC wiring, the DC power is discharged from the energy storage, converted into AC power and the AC power is outputted to the AC wiring;
a voltage detector that detects a system voltage at the AC wiring side of the power converter;
a target current value calculator that calculates, on an assumption that a virtual synchronous phase modifier is connected instead of the power conversion device, a target current value from a voltage difference between an internal electromotive force voltage in the virtual synchronous phase modifier and the system voltage detected by the voltage detector, and
circuitry that performs power conversion control between the AC wiring and the DC wiring by transmitting a drive signal to the power convener, wherein
the circuitry includes:
a phase calculator that calculates a current phase from the system voltage detected by the voltage detector;
a phase jump angle calculator that calculates a virtual phase that follows temporal changes in the current phase in a lagging manner, and calculates a phase difference between the current phase and the virtual phase as a phase jump angle; and
a drive signal generator that generates the drive signal to the power converter, which is a signal for adjusting active power that is inputted to or outputted from the power converter so as to suppress the phase jump angle, wherein
the drive signal generator generates the drive signal such that an alternating current outputted from the power converter to the AC wiring is adjusted to the target current value.

7. The power conversion device according to claim 6, wherein
the target current value calculator calculates an active current component and a reactive current component each as the target current value, and the drive signal generator generates the drive signal for adjusting the active power that is inputted to or outputted from the power converter so as to suppress the phase jump angle by using the calculated active current component and for adjusting reactive power that is inputted to or outputted from the power converter so as to suppress a voltage variation by using the calculated reactive current component.

8. A power conversion device comprising:
a power converter located between AC wiring, to which a power generator and an electrical load are connected, and DC wiring, to which means for storing energy is connected, the power converter configured to convert AC power inputted to the power converter through the AC wiring into DC power and charge the means for storing energy with the DC power, and to convert DC power inputted to the power converter through the DC wiring, the DC power is discharged from the means for storing energy, converted into AC power and the AC power is outputted to the AC wiring;
means for detecting voltage that detects a system voltage at the AC wiring side of the power converter;
an active power obtainer that obtains active power at the AC wiring side of the power converter; and
circuitry that performs power conversion control between the AC wiring and the DC wiring by transmitting a drive signal to the power converter, wherein
the circuitry includes:
a phase calculator that calculates a current phase from the system voltage detected by the means for detecting voltage;
a phase jump angle calculator that calculates a virtual phase that follows temporal changes in the current phase in a lagging manner, and calculates a phase difference between the current phase and the virtual phase as a phase jump angle; and
a drive signal generator that generates the drive signal to the power converter, which is a signal for adjusting active power that is inputted to or outputted from the power converter so as to suppress the phase jump angle, wherein
the phase jump angle calculator includes:
an angular velocity calculator that calculates, on an assumption that a virtual synchronous phase modifier is connected instead of the power conversion device, an angular velocity in the virtual synchronous phase modifier by using the obtained active power and a value that is based on a virtual inertia moment in the virtual synchronous phase modifier; and
an integrator that calculates, as the virtual phase, a phase in the virtual synchronous phase modifier by integrating the angular velocity.

9. The power conversion device according to claim 8 wherein,
the phase jump angle calculator calculates the virtual phase by integrating twice the phase jump angle in a past time.

10. The power conversion device according to claim 9, comprising a target current value calculator that calculates a target current value by applying a predetermined filter to the phase jump angle and multiplying an output from the filter by a predetermined proportional gain, wherein
the drive signal generator generates the drive signal such that an alternating current outputted from the power converter to the AC wiring is adjusted to the target current value.

11. The power conversion device according to claim 8, wherein
the phase jump angle calculator includes a phase compensator that phase-compensates the active power, and
the phase jump angle calculator inputs the phase-compensated active power to the angular velocity calculator.

12. The power conversion device according to claim 8, comprising a target current value calculator that calculates a target current value by applying a predetermined filter to the phase jump angle and multiplying an output from the filter by a predetermined proportional gain, wherein
the drive signal generator generates the drive signal such that an alternating current outputted from the power converter to the AC wiring is adjusted to the target current value.

13. A power conversion device comprising:
a power converter located between AC wiring, to which a power generator and an electrical load are connected, and DC wiring, to which means for storing energy is connected, the power converter configured to convert AC power inputted to the power converter through the AC wiring into DC power and charge the means for storing energy with the DC power, and to convert DC power inputted to the power converter through the DC wiring, the DC power is discharged from the means for storing energy, converted into AC power and the AC power is outputted to the AC wiring;
means for detecting voltage that detects a system voltage at the AC wiring side of the power converter;
a target current value calculator that calculates, on an assumption that a virtual synchronous phase modifier is connected instead of the power conversion device, a target current value from a voltage difference between an internal electromotive force voltage in the virtual synchronous phase modifier and the system voltage detected by the means for detecting voltage, and
circuitry that performs power conversion control between the AC wiring and the DC wiring by transmitting a drive signal to the power converter, wherein
the circuitry includes:
a phase calculator that calculates a current phase from the system voltage detected by the means for detecting voltage;
a phase jump angle calculator that calculates a virtual phase that follows temporal changes in the current phase in a lagging manner, and calculates a phase difference between the current phase and the virtual phase as a phase jump angle; and
a drive signal generator that generates the drive signal to the power converter, which is a signal for adjusting active power that is inputted to or outputted from the power converter so as to suppress the phase jump angle, wherein
the drive signal generator generates the drive signal such that an alternating current outputted from the power converter to the AC wiring is adjusted to the target current value.

14. The power conversion device according to claim 13, wherein
the target current value calculator calculates an active current component and a reactive current component each as the target current value, and the drive signal generator generates the drive signal for adjusting the active power that is inputted to or outputted from the power converter so as to suppress the phase jump angle by using the calculated active current component and for adjusting reactive power that is inputted to or outputted from the power converter so as to suppress a voltage variation by using the calculated reactive current component.

\* \* \* \* \*